US009081746B1

(12) United States Patent
Helter

(10) Patent No.: US 9,081,746 B1
(45) Date of Patent: Jul. 14, 2015

(54) METHOD FOR CLIENT CONFIGURATION MANAGEMENT IN REMOTE COMPUTING

(71) Applicant: Teradici Corporation, Burnbay (CA)

(72) Inventor: Paul Andrew Helter, British Columbia (CA)

(73) Assignee: Teradici Corporation, Burnaby, British Columbia (CA)

( * ) Notice: Subject to any disclaimer, the term of this patent is extended or adjusted under 35 U.S.C. 154(b) by 298 days.

(21) Appl. No.: 13/653,073

(22) Filed: Oct. 16, 2012

(51) Int. Cl.
*G06F 15/177* (2006.01)
*G06F 15/16* (2006.01)

(52) U.S. Cl.
CPC .............. *G06F 15/177* (2013.01); *G06F 15/16* (2013.01)

(58) Field of Classification Search
CPC .................. G06F 15/17–15/177; G06F 15/16; G06F 17/30; G06F 3/12; G06F 11/00; G06F 13/14; H04L 23/28; H04L 12/28; H04L 12/66
USPC ................. 709/201–203, 208–211, 217–228
See application file for complete search history.

(56) References Cited

U.S. PATENT DOCUMENTS

| | | | | |
|---|---|---|---|---|
| 5,757,916 A * | 5/1998 | MacDoran et al. | ............ | 380/258 |
| 5,838,918 A * | 11/1998 | Prager et al. | .................... | 709/221 |
| 5,889,953 A * | 3/1999 | Thebaut et al. | ................ | 709/221 |
| 6,446,200 B1 * | 9/2002 | Ball et al. | ........................... | 713/1 |
| 6,463,454 B1 * | 10/2002 | Lumelsky et al. | ............ | 718/105 |
| 7,219,122 B1 * | 5/2007 | Pena-Mora et al. | ........... | 709/201 |
| 7,246,163 B2 * | 7/2007 | Tindal | ........................... | 709/223 |
| 7,284,244 B1 * | 10/2007 | Sankaranarayan et al. | ... | 718/104 |
| 7,376,719 B1 * | 5/2008 | Shafer et al. | ................... | 709/220 |
| 7,457,855 B2 * | 11/2008 | Fortman et al. | ................ | 709/221 |
| 7,987,272 B2 * | 7/2011 | Kumar et al. | ................. | 709/227 |
| 8,175,645 B2 | 5/2012 | Evans et al. | | |
| 8,332,464 B2 * | 12/2012 | Dispensa et al. | .............. | 709/203 |
| 8,611,370 B2 * | 12/2013 | Bearden et al. | ................ | 370/463 |
| 8,621,067 B2 * | 12/2013 | Fan et al. | ....................... | 709/224 |
| 2003/0074601 A1 * | 4/2003 | Schultz et al. | ................... | 714/15 |
| 2004/0235464 A1 | 11/2004 | Korkalo et al. | | |
| 2005/0188056 A1 | 8/2005 | Kangas et al. | | |
| 2006/0031435 A1 * | 2/2006 | Tindal | ........................... | 709/220 |
| 2007/0174410 A1 * | 7/2007 | Croft et al. | ..................... | 709/208 |
| 2007/0198656 A1 * | 8/2007 | Mazzaferri et al. | ........... | 709/218 |
| 2007/0244998 A1 * | 10/2007 | Tindal | ........................... | 709/220 |
| 2007/0268506 A1 * | 11/2007 | Zeldin | ........................... | 358/1.13 |
| 2008/0195951 A1 * | 8/2008 | Oshiro et al. | .................. | 715/735 |
| 2009/0310028 A1 | 12/2009 | Sadri et al. | | |
| 2010/0205281 A1 * | 8/2010 | Porter et al. | ................... | 709/220 |
| 2011/0208870 A1 * | 8/2011 | Deason | ......................... | 709/228 |

(Continued)

OTHER PUBLICATIONS

"Quality of Service Negotiation Based on Device Capabilities and User Preferences", K. El-Khatib, X. He, G. v. Bochmann., Technical Report, Univ. Ottawa., Canada., May 2000, 11 pages.

(Continued)

*Primary Examiner* — Brian J Gillis
*Assistant Examiner* — Boris Grijalva Lobos
(74) *Attorney, Agent, or Firm* — Moser Taboada

(57) ABSTRACT

A method and apparatus for endpoint configuration management comprising receiving an endpoint topology and storing the endpoint topology in a configuration store, modifying a configuration for a remote session to conform to the endpoint topology and corresponding the configuration to the endpoint topology in the data structure and presenting to the endpoint the modified configuration of the remote session.

20 Claims, 17 Drawing Sheets

(56) References Cited

U.S. PATENT DOCUMENTS

| | | | | |
|---|---|---|---|---|
| 2012/0084412 | A1* | 4/2012 | Burns et al. | 709/221 |
| 2012/0179785 | A1* | 7/2012 | Wu et al. | 709/218 |
| 2012/0240243 | A1* | 9/2012 | Allardyce | 726/28 |
| 2012/0265810 | A1* | 10/2012 | Reid et al. | 709/204 |
| 2014/0189136 | A1* | 7/2014 | Bryan | 709/228 |
| 2014/0189790 | A1* | 7/2014 | Mindler et al. | 726/3 |

OTHER PUBLICATIONS

"Profile-Aware Multi-Device Interfaces: An MPEG-21-Based Approach for Accessible User Interfaces", Kris Luyten, Kristof Thys and Karin Coninx Hasselt University., Accessible Design in the Digital World Conference 2005., Aug. 2005., Scotland, 8 pages.

"Raster Image Adaptation for Mobile Devices using Profiles", R. Rosenbaum, B. Hamann, SPIE—Electronic Imaging 2012, San Francisco/US, Jan. 22-26, 2012, 10 pages.

"Sun Desktop Manager Tutorial", Willem van Schaik, Sun Microsystems, CA, USA. May 2006, 26 pages.

"User Profiles, Personalization and Privacy", A joint WG1 / WG2 / WG7 whitepaper, final briefing. Slide Presentation. Josef Noll, Mario Hoffmann WWRF Meeting #22, Paris, France, May 5-7, 2009, 38 pages.

"Dexpot 1.5—The utility for virtual desktops. Quick Start Guide", Dexpot GbR., Sep. 29, 2010, Wesel, Germany, 14 pages.

\* cited by examiner

IDENTITY
MULTI/SINGLE_SESSION
DISPLAY_ATTRIBUTES
NETWORK_INTERFACE
PROCESSOR_ATTRIBUTES
PERIPHERAL_ATTRIBUTES
PROTOCOL_ATTRIBUTES
APPLICATION_INFO

PRINTER_PREFS
LANGUAGE_PREFS
TIME_ZONE
PERIPHERAL_PREFS

FIRST_HOP_PREFS
BANDWIDTH_LIMIT

US 9,081,746 B1

METHOD FOR CLIENT CONFIGURATION MANAGEMENT IN REMOTE COMPUTING

BACKGROUND OF THE INVENTION

1. Field of the Invention

Embodiments of the present invention relate generally to a method and apparatus for client configuration management in remote computing.

2. Description of the Related Art

User profiles, adaptive hypermedia (AH) and web personalization techniques generally store descriptions related to the characteristics of people in order to personalize human-computer interaction or apply administrative policies across groups of users. Device profiles generally comprise simple sets of device attributes assigned to a user or a specified enterprise access device such as a phone that, when applied to a device, restrict or tailor its capabilities.

However, these techniques fail to address many challenges faced by the modern employee who desires effective access to a mix of remote enterprise, personal, or cloud-based computing resources using any from a variety of client devices without the need to continuously re-configure or adjust back-end desktops or applications to most effectively utilize the capabilities of the client topology at hand. Therefore, there is a need in the art for a method and apparatus that manages client configurations according to the immediate needs of computer users.

SUMMARY OF THE INVENTION

Embodiments of the present invention generally relate to a method for endpoint configuration management comprising receiving an endpoint topology and storing the endpoint topology in a configuration store, modifying a configuration for a remote session to conform to the endpoint topology and corresponding the configuration to the endpoint topology in the data structure and presenting to the endpoint the modified configuration of the remote session.

Further embodiments of the present invention generally relate to an apparatus for endpoint configuration management comprising a configuration manager for receiving an endpoint topology and storing the endpoint topology in a configuration store, modifying a configuration for a remote session to conform to the endpoint topology and corresponding the configuration to the endpoint topology in the data structure and a connection manager for presenting to the endpoint the modified configuration of the remote session.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 8 illustrates an exemplary set of physical topology attributes;

FIG. 9 illustrates an exemplary set of topology preferences;

FIG. 10 illustrates an exemplary set of network preferences;

DETAILED DESCRIPTION

Figure 1:
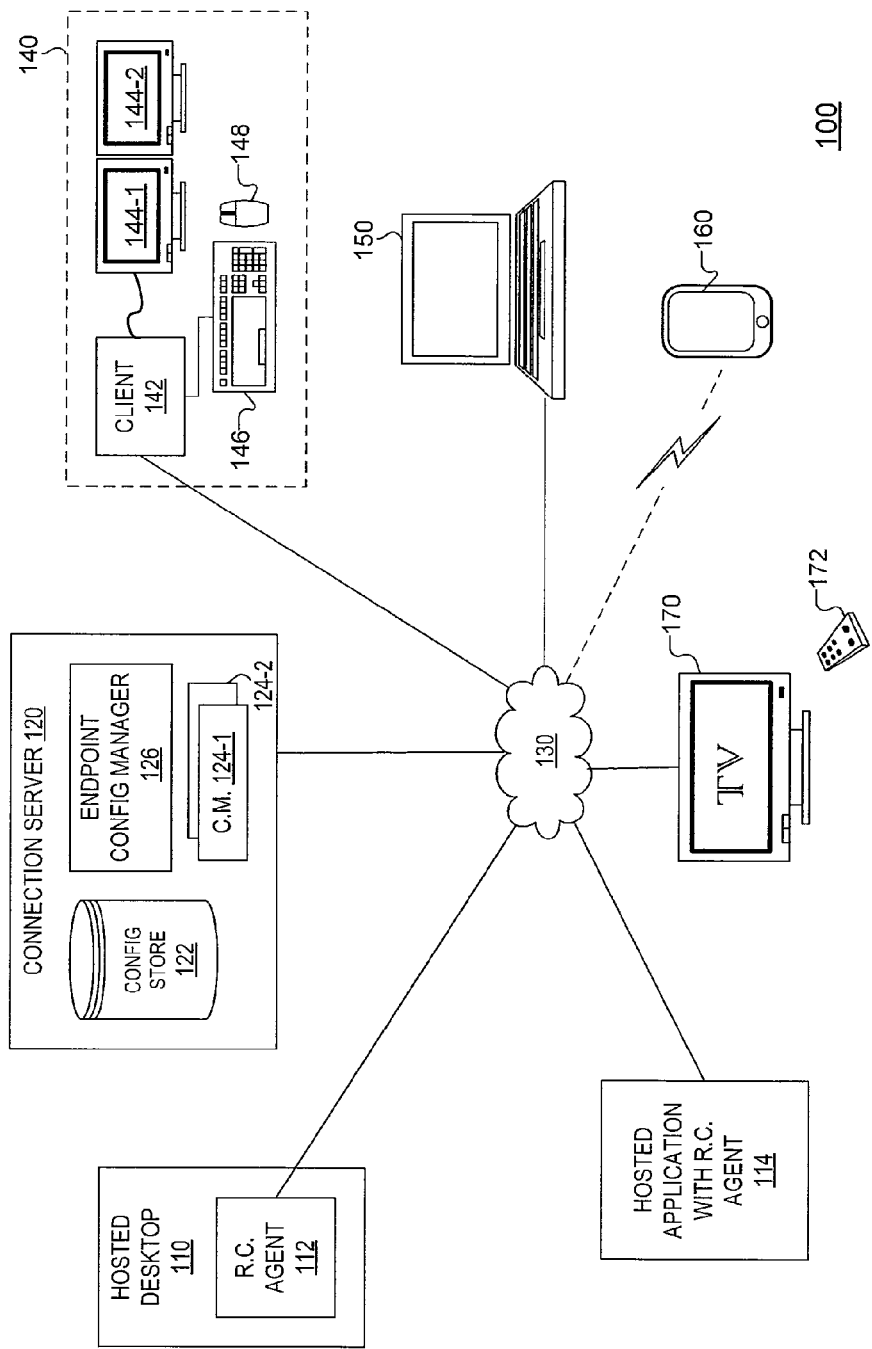
FIG. 1 illustrates selected details of an embodiment of a system comprising a connection server for coupling hosted desktops and hosted applications to clients.

The invention may be implemented in numerous ways, including as a process, an article of manufacture, an apparatus, a system, and as a set of computer-readable descriptions and/or instructions embedded on and/or in a computer-readable medium such as a computer-readable storage medium. In this specification, these implementations, or any other form that the invention may take, may be referred to as techniques.

The Detailed Description provides an exposition of one or more embodiments of the invention that enable improvements in features such as performance, power utilization, cost, scalability, efficiency, and utility of use in the field identified above. The Detailed Description includes an Introduction to facilitate the more rapid understanding of the remainder of the Detailed Description. The invention encompasses all possible modifications and variations within the scope of the issued claims.

The term processor as used herein refers to any type of processor, central processing unit (CPU), microprocessor, microcontroller, embedded processor, media processor, graphics processor, or any other programmable device capable of executing and/or interpreting instructions in a form of software (such as microcode, firmware and/or programs).

The term software as used herein refers to any type of computer-executable instructions for any type of processor, such as programs, applications, scripts, drivers, operating systems, firmware, and microcode. Computer-executable instructions include any types of instructions performed by a processor, such as binary instructions that are directly performed, instructions that are translated and/or decoded prior to being performed, and instructions that are interpreted.

The term 'physical topology' as used herein generally refers to the physical attributes of a client endpoint including a unique identifier (typically a MAC address), an identification of supported remote computing protocol versions, a display configuration (e.g. quantity, layout and native resolution of displays) and peripheral device configuration (e.g. device descriptions). A topology may present additional attributes such as memory information, cache information, decoder attributes, client endpoint application descriptions and the like.

The term 'topology preference' as used herein refers to a stored preference such as a language preference, time zone preference, peripheral device preference (e.g. mouse sensitivity or audio preference), image quality or a security setting. Some topology preferences may be user programmable while others are generally enforced by administrative policies.

The term 'session' as used herein generally refers to a 1:1 computing connection between a client's user interface and a 'session host' comprising one of i) a local operating system, ii) a local application, iii) a remote computer, iv) a hosted desktop or v) a hosted application. In some Universal Communications (UC) embodiments, a session comprises a voice or video connection between a client and a UC client elsewhere on the network.

The term 'configuration' as used herein refers to a uniquely identified set of topology and session preferences that may be applied to a client and/or associated session host.

The term 'computing resources' as used herein refers to any of local operating system, local application, remote computer, hosted desktop or hosted application resources.

Introduction

In one or more embodiments of the present invention, a computing system, such as system 100 in FIG. 1, comprises a connection server configured to facilitate the establishment of computing sessions by mapping the physical topology attributes of client devices, including display topology and peripheral device attributes, to desired computing configurations managed by the connection server. Such computing configurations include user-defined preferences such as display layout and connection rules in addition to administrative policies such as accessibility restrictions. A user initiates a session with the connection server with one or more hosted desktops or one or more hosted applications. A hosted desktop is a desktop computing environment which is hosted by a remote server and delivers all applications and other functionality from the server to the client in the hosted desktop. A hosted application is a single application which is hosted by a remote server and delivers a single application in addition to other functionality from the server to the client in the application.

As an example, when a user accesses a hosted desktop from a first client (e.g. a client comprising multiple displays), one or several application windows are presented in a desired layout on the displays which is retained as configuration information, typically by the connection server. When the user accesses the same hosted desktop from a second client (e.g. a less capable mobile client), a different layout of application windows is presented on the mobile display which might require automatic launch of some applications and automatic termination or window minimization of others. The user is later enabled to select a best matching configuration when returning to the first client. Such a best matching configuration may include the last used configuration at the same client, a last used configuration intelligently mapped from a different client or a pre-defined configuration associated with the user's present role or activity.

FIG. 1 illustrates selected details of an embodiment of a computing system 100 ("system 100") for access to one or more local and/or remote desktops and/or applications (collectively termed 'hosted applications' for sake of convenience). System 100 comprises a hosted desktop 110 such as a virtualized desktop infrastructure (VDI) desktop and one or more clients 140, 150, 160 and/or 170 coupled to a computer network 130. Such VDI desktops generally comprise an industry standard desktop operating system (e.g. Microsoft Windows or Linux GNOME), a remote computing protocol including remote computing agent 112 (e.g. VMware VIEW, Citrix XENDESKTOP or Microsoft RDS) and underlying virtualization infrastructure such as VMware ESX, Citrix XENSERVER or Microsoft Hyper-V products. Generally, multiple hosted desktops 110 ("remote desktops") are configured to execute on a farm of VDI servers in an enterprise datacenter. System 100 may additionally or alternatively provide one or more hosted applications 114 ("remote applications"), generally executed on application servers and accessed from clients using remote application access technologies such as XENAPP, Remote Desktop Session Host (RDSH) terminal services, App-V, or PCOIP from corporations such as Citrix, Microsoft, or Teradici. Such application servers generally comprise remote computing agents that facilitate connection establishment, provide image encoding services and protocols such as USB-over-IP for enabling applications to be controlled by peripheral devices located at a client endpoint. In some embodiments, other computing resources such as standalone workstations or cloud-hosted applications may be coupled to network 130 for remote desktop or remote application access using remote computing protocols known to the art such as PCOIP, XENDESKTOP, REMOTEFX, VERDE or HTML5.

According to one embodiment, the client 140 comprises a computer 142 coupled to displays 144 (shown as a display 144-1 and a display 144-2) and peripheral devices including for example a keyboard 146 and a mouse 148. Computer 142 comprises processor, memory and software or firmware suitable for executing one or several remote computing client protocols. Embodiments of computer 142 include workstation computers, thin client terminals or zero client terminals. Alternative embodiments of client 140 may comprise any different number of displays supported by computer 142 and may further comprise additional peripheral devices such as microphone and/or speakers, printer, personal music players, webcam and the like coupled to computer 142 using an interface such as USB. Alternative embodiments of client 140 comprise a projection device with embedded or co-located computer 142 with projection screen and wireless peripheral devices as might be utilized in a meeting room or conference facility.

A user of system 100 may access hosted desktop 110 or hosted application 114 from any of various clients such as one of a portable computer 150 (e.g. a laptop, an ultra-book or the like), a mobile client 160 (e.g. a smartphone or tablet computer) or an entertainment client such as television 170 with remote control 172 or gaming apparatus such as XBOX, PLAYSTATION or the like, any of which is enabled to execute at least one remote computing client protocol and connect to network 130 by wired or wireless means. In some embodiments, a mobile client 160 is enabled to connect to network 130 via either wireless LAN (W-LAN e.g. 802.11) or cellular (e.g. 3G data protocols) dependent on location and the applied computing configuration.

System 100 comprises a connection server 120 such as a rack mounted server enabled to execute connection management software including one or more connection managers (shown as a connection manger 124-1 and a connection manager 124-2) and endpoint configuration manager 126 and further enabled to store computing configurations i.e. "configurations" in configuration store 122 which may comprise any suitable database structure accessible by a query language such as SQL, according to one embodiment. The connection manager 124 generally manages lists or pools of users, desktops and application resources and facilitates the establishment of secure and authorized connections between authenticated clients and hosted applications. According to one embodiment, one or more connection managers, including those from service providers or well-known enterprise brokers such as VMware VIEW connection server, Citrix Desktop Studio or Ericom BLAZE are enhanced to accept client-originated user credentials from endpoint configuration manager 126 and present available hosted applications to endpoint configuration manager 126 for parsing and presentation to the client. The endpoint configuration manager 126 provides rule-based mapping of configurations comprising available computing resources and client topology preferences using methods described herein. A structured approach to mapping enables users to tailor endpoint environments to their immediate roles (e.g. "My Laboratory Configuration", "My Consultation Office"; "My Surgery Room", "My Office Cubicle", "My Home TV Desktop" etc.), move around between endpoints while maintaining desired configurations or changing roles and efficiently migrating desired preferences from one client endpoint to another.

In various embodiments, the connection manager 124 and endpoint configuration manager 126 are executed by different connection servers 120 which are nevertheless coupled by network 130. In different embodiments, the connection manager 124 and endpoint configuration manager 126 comprise virtualized appliances configured to run directly on a hypervisor such as ESX or server application software compatible with standard server operating systems such as LINUX or Microsoft WINDOWS SERVER products. Configuration store 122 stores various data described herein typically stored on non-volatile media such as disk or solid state drives (SSD) local to the connection server 120 or a network accessible storage apparatus coupled to network 130. In some embodiments, clients 140, 150 or 160 contain data structures in local memory for storage of endpoint configuration information or topology preferences (i.e. a portion of store 122) that enables the client to determine an appropriate endpoint configuration in the absence of immediate accessibility to store 122.

The network 130 comprises a communication system (e.g., the Internet, local area network (LAN), wireless LAN, wide area network (WAN), and the like) that connects computer systems completely by wire, cable, fiber optic, and/or wireless links facilitated by various types of well-known network elements, such as hubs, switches, routers, and the like. In one embodiment, the network 130 may be a shared packet switched network that employs various well-known protocols (e.g., TCP/IP, UDP/IP and the like) to communicate information amongst the network resources. For example, in various embodiments, the network 130 employs part of the Internet.

Figure 2:
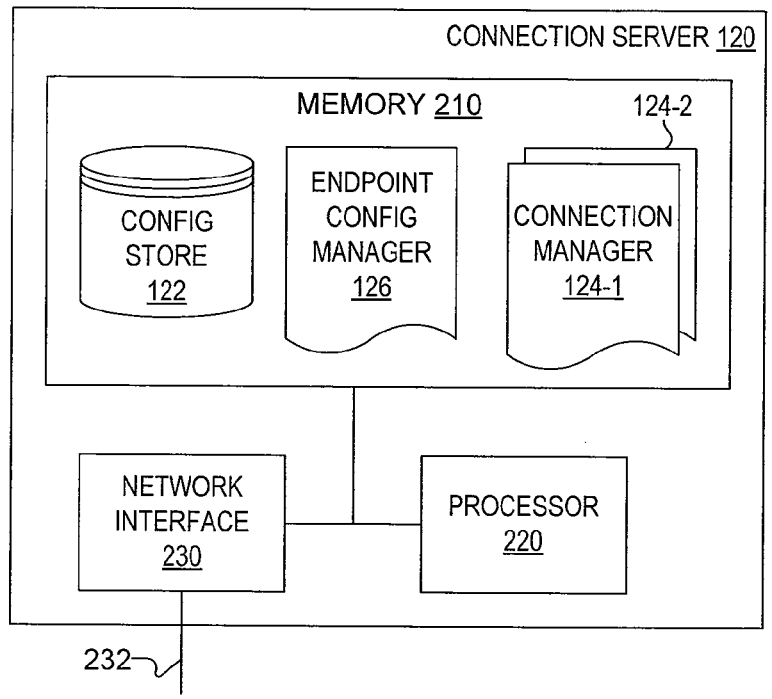
FIG. 2 illustrates selected details of an embodiment a connection server.

FIG. 2 illustrates selected details of an embodiment of a connection server 120 comprising a processor 220 such as a server processor sub-system (e.g. INTEL XEON or AMD OPTERON based server) coupled to memory 210 and network interface 230 which provides connectivity such as an Ethernet/IP connection 232 to network 130 and optionally high speed access means such as FIBERCHANNEL for initiating connections to remote storage. The memory 210 comprises any one or combination of volatile computer readable media (e.g., random access memory (RAM), such as dynamic random access memory (DRAM), static random access memory (SRAM), extreme data rate (XDR) RAM, Double Data Rate (DDR) RAM, and the like) and nonvolatile computer readable media (e.g., ROM, hard drive, tape, CDROM, DVDROM, magneto-optical disks, Erasable Programmable Read-Only Memory (EPROM), Electrically Erasable Programmable Read-Only Memory (EEPROM), Flash EPROM, and the like). Moreover, memory 210 may incorporate electronic, magnetic, optical, and/or other types of storage media. In an exemplary embodiment, the memory 210 stores executable software in the form of machine-readable instructions, including connection manager 124, endpoint configuration manager 126, and components not depicted in FIG. 2, such as application software, operating system components, drivers, administrative software such as active directory services and the like. Endpoint configuration manager 126 is enabled to access and process sets of configurations stored in configuration store 122, each set generally associated with a user identity received from a client such as clients 140, 150 or 160. In a typical embodiment, client devices are isolated from the configuration store by the endpoint configuration manager 126.

Figure 3:
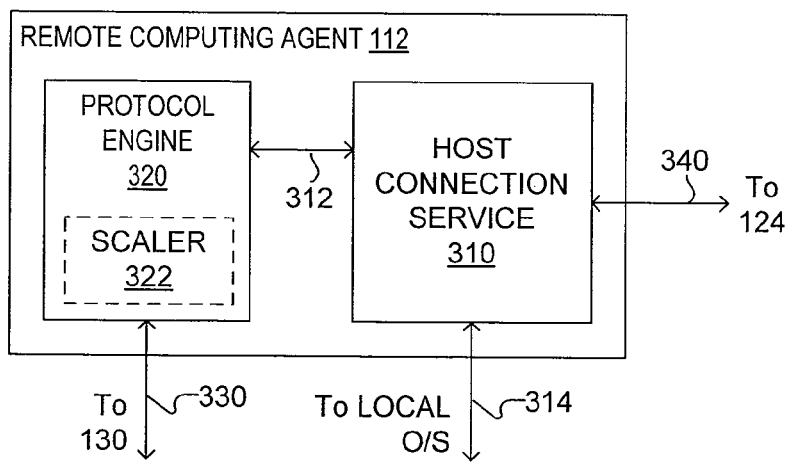
FIG. 3 illustrates selected details of an embodiment of a remote computing agent.

FIG. 3 illustrates selected details of an embodiment of a remote computing agent 112 comprising a host connection service 310 and a protocol engine 320. In an embodiment, remote computing agent 112 provides a protocol connection 330 such as PCOIP, HDX or RDP to a client and a secure management connection 340 such as a TLS connection to connection manager 124 over which computing session parameters are negotiated. In an embodiment, protocol engine 320 receives a set of protocol parameters 312 (e.g. protocol version, encryption requirements, encoding requirements and so on) negotiated by host connection service 310 during connection establishment, following a change in network conditions or responsive to a change in client configuration such as re-arrangement of windows. In some embodiments, host connection service 310 negotiates a specific encryption standard (e.g. SALSA20, AES-128 or AES-256 encryption) or a channel encoding reliability level dependent on requirements requested by connection manager 124. In other embodiments, protocol parameters 312 includes specific image encoding instructions such as specification of a partial display area (e.g. in a particular case in which client 140 may have multiple simultaneous sessions to different hosted applications, some of which are partially obscured by others on display 144). Protocol parameters 312 may also provide instructions to protocol engine 320 to re-scale a display image (ref. scaler 322) to a format such as a thumbnail image view as specified by a particular configuration, for example to make efficient use of available display area when a hosted desktop 110 is coupled to a mobile client 160.

In some embodiments, the host connection service 310 provides interface 314 (e.g. an Application Programming Interface (API)) to the underlying desktop operating system for exchanging commands that prepare the desktop according to a negotiated configuration (e.g. launch select applications, terminate other select applications, minimize select applications, modify the window layout position or z-ordering (ordering of overlapping windows in a display), set a specified application to full screen view, adjust audio preferences, adjust cursor sensitivity, adjust desktop wallpaper or icon placement, set default printer device, set active network interface such as WiFi/3G or other programmable preferences related to the operating-system). Host connection services 310 may retrieve application information (e.g. a list of available applications) for sharing with the endpoint configuration manager, typically as a prequel to mapping a configuration.

Figure 4:
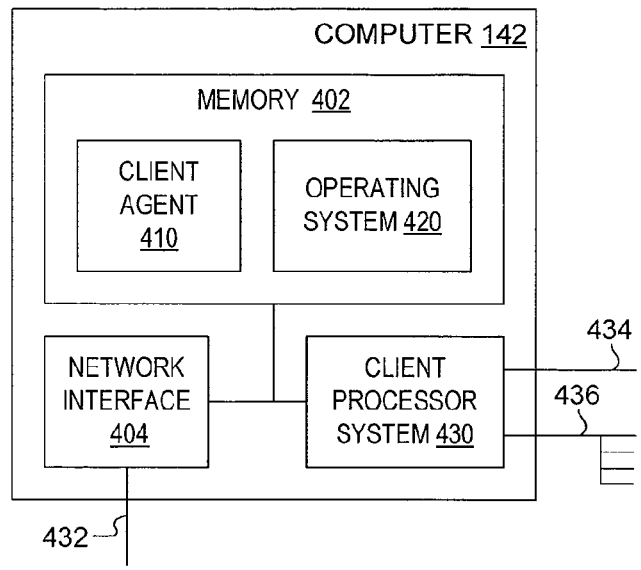
FIG. 4 illustrates selected details of an embodiment of a computer comprising a client agent and operating system.

FIG. 4 illustrates selected details of an embodiment of a computer 142 comprising a client agent 410 and operating system 420 such as a desktop or embedded version of Microsoft Windows, Linux or iOS or a real time OS such as THREAD-X from Express Logic Inc. in memory 402 coupled to client processor system 430 and network interface 404 with network connection 432 to network 130 (e.g. Ethernet or 802.11 wireless). Client processor system 430 typically comprises a lightweight CPU sub-system but may comprise an enterprise-class PC or workstation with GPU and suitable operating system such as WINDOWS 7. Lightweight alternatives of processing sub-system 430 include INTEL ATOM, NVIDIA TEGRA or VIA EDEN class microprocessor and associated I/O interfaces or zero client processor typically comprising dedicated decoding circuitry (e.g. H.264, MPEG-2, WMA, VC-1 and/or WEB-M decoder) supported by embedded processing facilities such as single- or multi-core ARM or MIPS processor and optionally GPU resources. In some zero client embodiments, parts of client agent 410 such as image decoder, scaler and compositor components are implemented at least in part using Application Specific Integrated Circuit (ASIC), FPGA or DSP resources for maximum decoder performance. Some embodiments of computer 142 comprise additional video conferencing features such as image encoding resources associated with a webcam, VOIP codecs, echo cancellation, gesturing, image recognition services or the like. Client processor system 430 provides display connection 434 such as DISPLAYPORT to displays 144 and peripheral device connections 436 such as USB or BLUETOOTH to keyboard 146 and mouse 148. In some embodiments, the client comprises content protection services such as HDCP that restricts content associated with connection 434.

Figure 5:
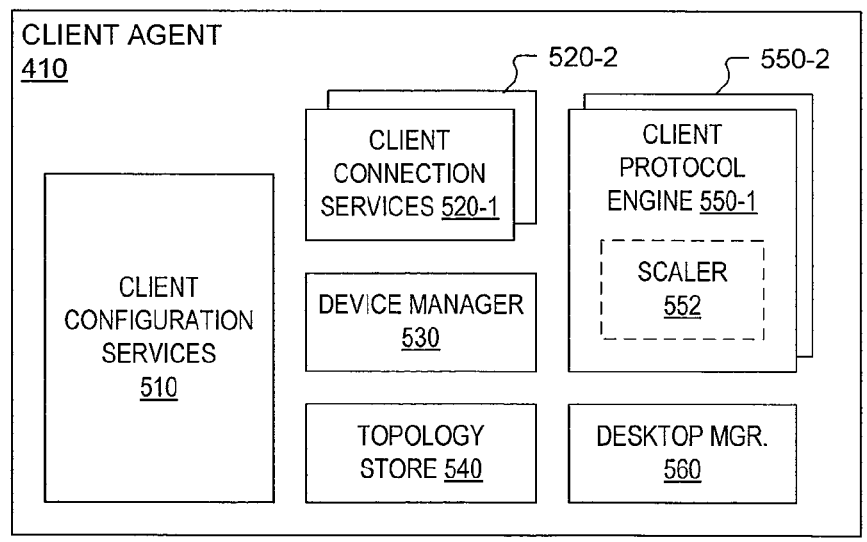
FIG. 5 illustrates selected details of a client agent for a multi-session client.

FIG. 5 illustrates selected details of a client agent 410 for a multi-session embodiment of client 140 enabled to present several simultaneous remote desktops, remote applications and/or local applications to client 140. Hosted desktops or applications are typically each accessed using isolated remote computing sessions, each established using unique encryption keys and session parameters. Local computing sessions (e.g. local applications or OS) associated with a client such as laptop client 150 may be established with aid of client virtualization technologies such as VMware fusion or Parallels or reverse access technologies such as Virtual Desktop Extender from RES Software Corporation. Client agent 410 comprises client protocol engines 550 (shown as an engine 550-1 and an engine 550-2), each of which provide decoder services complementary to protocol engine 320. In some embodiments, client agent 410 is enabled for simultaneous remote desktop or remote application connections using different protocols.

For example, client 140 may connect to hosted desktop 110 using a PCOIP protocol connection while simultaneously connected to hosted application 114 using a XENDESKTOP connection. Desktop Manager 560 operates in conjunction with image decoder, optional scaler 552 used for scaling client-rendered protocols and graphics processor to compose different desktop and/or application sessions as movable windows on one or more displays 144. Generally, the client connection services 520 (shown as a connection service 520-1 and a connection service 520-2) initiate requests with pre-assigned connection managers 124 to establish remote sessions or local sessions such as a session between client agent 410 and a local operating system or a local device such as a smartphone or tablet device. In some embodiments, for example if a child session is logically coupled to a different parent session, the child session is initiated by a connection manager 124 and presents configuration options to the user as described later herein. Device manager 530 manages the interface between peripheral device termination services (e.g. local HID class drivers or device redirection drivers associated with HID drivers executed by a remote desktop) and the client protocol engines 550 by bridging peripheral device information to the active computing session (e.g. the session window deemed to be 'in focus' as determined by the pointer location) or directing the peripheral device information to a session associated with a local operating system or attached device.

Topology store 540 stores data structures for storing physical topology attributes such as network MAC information, display attributes (e.g. resolution and display topology order), application descriptions or a list of protocol versions supported by client 140. Client configuration services 510 support user login functions for establishing sessions and provides utilities such as local menus and/or a browser that enable users to save desired configuration information including topology preferences (e.g. keyboard language preferences) and window layout for subsequent retrieval at the same client or replication on a different client. Such preferences may be stored as encrypted topology information on topology store 540 or uploaded to configurations data store 122 via a suitable connection such as a management connection between configuration service 510 and endpoint configuration manager 126. Client configuration services 510 may also provide client or network diagnostic functions, session management functions (e.g. session window maximize, session minimize, session thumbnail view, session status indication or metrics), physical topology change detection and notification services (e.g. notifying endpoint configuration manager 126 when devices are added or removed, network status monitoring, image quality metrics etc.) and additional support services.

Figure 6:
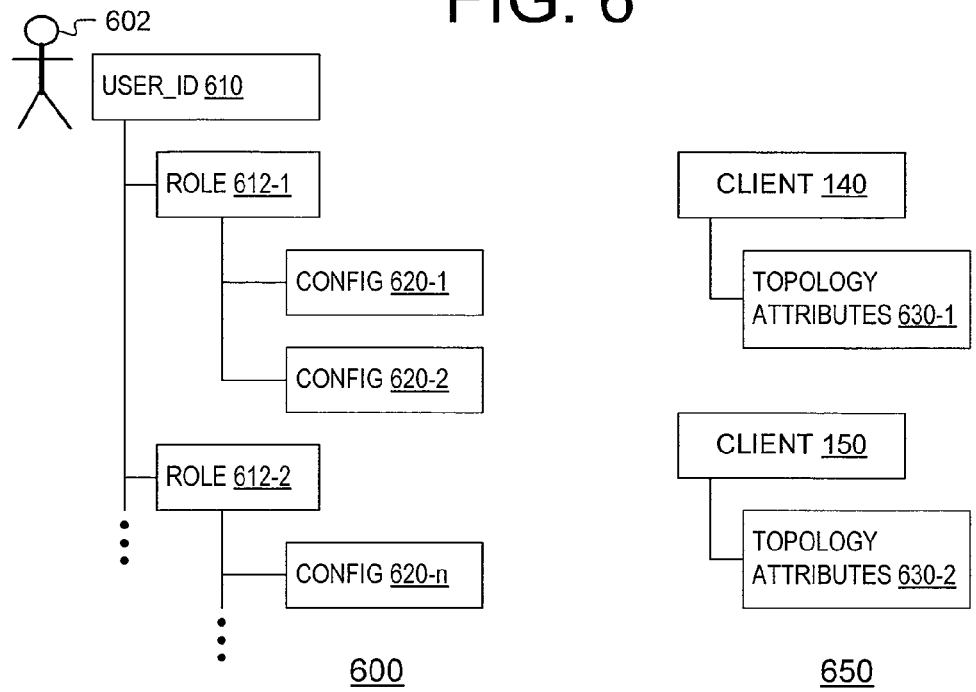
FIG. 6 illustrates logical hierarchies for configuration information as may be arranged in a configuration store and topology information as may be arranged in a topology store.

FIG. 6 depicts logical hierarchies for i) configuration information as may be arranged in configuration store 122 and ii) topology information as may be arranged in topology store 540. Referring first to user identity data structure 600, a unique USER_ID 610, as might be associated with a user 602 in Microsoft Active Directory or a service provider's subscription list, is associated with a number of unique configurations, identified as CONFIG 620-1 and CONFIG 620-2. In some embodiments, configurations are grouped according to user role (shown as role 612-1 and role 612-2), each role defined by an identified user's activity that warrants commonality in configurations (e.g. commonality in launched applications and window layout) applied across different clients. Each time a new configuration for user 602 is generated, a CONFIG 620-*n* and accompanying configuration information is associated with USER_ID 610, optionally attached to a specified role 612.

Referring to client data structures 650, each client determines its own physical attributes which are stored and made available to endpoint configuration manager 126 in order to map a suitable configuration to the client topology. For example, client 140 comprises topology attributes 630-1, client 140 comprises topology attributes 630-2 and so on.

Figure 7:
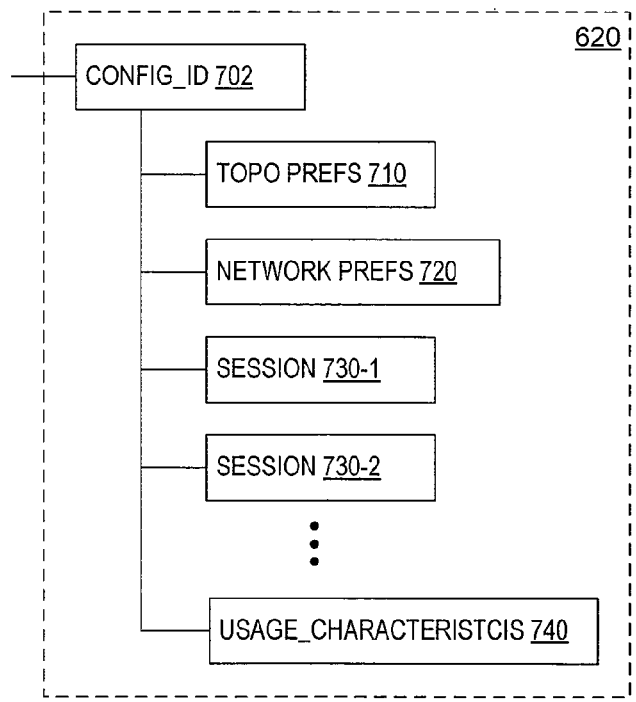
FIG. 7 illustrates a logical hierarchy for a configuration.

FIG. 7 depicts a logical hierarchy for a configuration 620 which defines layouts such as display layout and peripheral device preferences in addition to other policies and preferences. CONFIG_ID 702 provides a unique identifier for the configuration. TOPO_PREFS 710 provide a set of user- and/or administrator specified preferences associated with a client. NETWORK_PREFS 720 provide network connection and routing preferences. In select alternative embodiments, network preferences are determined on a per-session basis which for example, enable one session within a configuration to utilize an Ethernet LAN connection on a corporate network while a second session utilizes a 3G wireless connection outside the corporate domain. A set of session-specific data structures 730 (shown as a session 730-1 and a session 730-2) each specify attributes for a specified session; a configuration 620 comprising a single computing session generally comprises a single session 730. In some embodiments, configuration 620 comprises a set USAGE_CHARACTERISTICS 740 which collects usage data that enable endpoint configuration manager 126 to determine suitable future configurations for clients based on historic usage patterns. As an example, a particular configuration may be determined to be commonly used on a particular client, or likely to be selected at a particular time of day or selected at a particular geo-location or selected immediately following another particular configuration and so on.

FIG. 8 depicts an exemplary set of topology attributes 630, comprising a unique client identifier such as a machine name, network identity, FQDN, or the like and optionally client location information, for example as provided by a geo-location function. Topology attributes 630 further define single/multi-session support capability, display attributes such as native resolution and multi-monitor layout, peripheral device attributes such as a list of attached devices, network interface(s) capabilities, client processing and storage resources (e.g. decoder features and capabilities such as H.246 decode capabilities, client cache and protocol features (e.g. list of supported protocols and versions, including security features and encryption capabilities). In select embodiments in which the client, such as a laptop client 150, comprises a local operating system and a set of local applications, application descriptions (e.g. a list of available applications) may be published in the list of topology attributes 630. In some such cases, administrative policies may override or filter the list of applications available to a specific user based on information such as user credentials and/or location.

Administrative policies may also define constraints on a particular configuration (such as CPU, network, display access or other topology constraints) based on such user credentials. Local applications may be identified to facilitate selection (e.g. in preference over remote applications) if a suitable local application is available. In some embodiments, for a particular client, a distinction can be made between the topology attributes associated with a remote computing session and those topology attributes associated with the local operating system and applications. This enables a remote administrator to assign topology resources for local and remote applications as well as determine application availability from a broad perspective to allow remote selection of source applications, to redirect users to alternative clients (e.g. higher performance client with additional features) or to unlock additional client capabilities. Furthermore, such differentiated topology attributes provides a means for extracting usage statistics in terms of attributes and capabilities of a client portfolio, useful for infrastructure forecasts and so on.

FIG. 9 depicts an exemplary set of topology preferences 710 including printer preferences (i.e. default printer associated with a configuration), language and time zone preferences, peripheral device preferences (e.g. mouse sensitivity, default audio device, device redirection preferences) and various other topology preferences typical of a mobile client, thin client or zero client. In some embodiments, select preferences 710 may be determined on a per-session basis which for example, enables use of a particular audio device (e.g. headphones) in conjunction with a particular computing session and possibly concurrent use of another audio device (e.g. speakers) in conjunction with a different computing session.

FIG. 10 depicts an exemplary set of network preferences 720 including first hop network preference which enables, for example, a mobile client 160 to utilize a 3G data connection and alternatively use an 802.11 connection when operating in vicinity of a corporate WLAN. Other such network preferences may restrict bandwidth consumption or provide constraints on image quality or frame rate.

Figure 11:
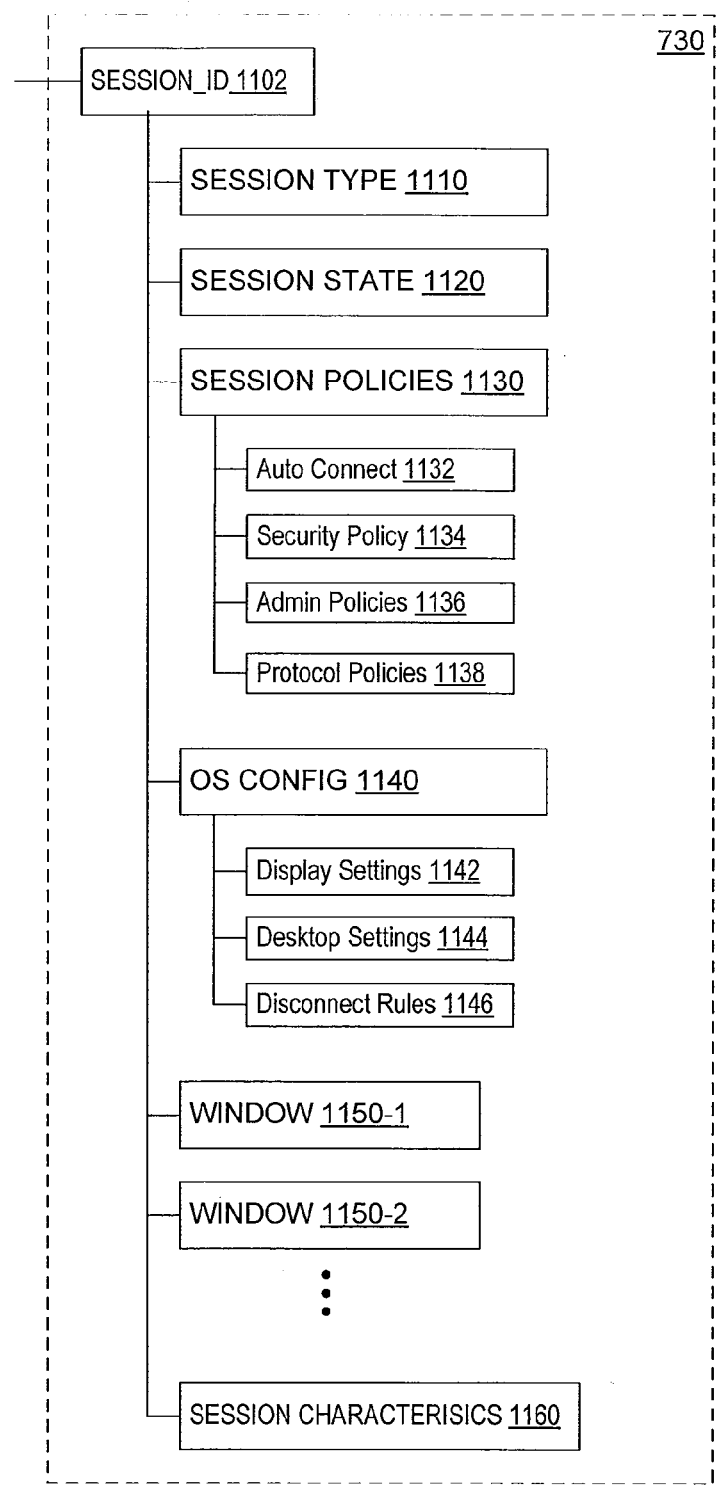
FIG. 11 illustrates a logical hierarchy for attributes of a session.

FIG. 11 depicts a logical hierarchy for attributes of a session 730, identified by SESSION_ID 1102. Session Type information 1110 defines session host addressing information (e.g. session host IP address) and type information such as a remote desktop session type, a remote application session type, a local desktop session type (e.g. in instances in which a client 150 comprises a local set of applications), a unified communication session type (e.g. associated with a VoIP or video conferencing service) or a streaming media session type (e.g. associated with a streaming media service or redirected home entertainment content). In some embodiments, "reverse seamless" sessions may be specified in which locally executed applications are integrated in the operating system menu and command execution framework of a hosted desktop.

Session state 1120 specifies whether a session is active and displayed, active and minimized or presented as a thumbnail image, whether a session is parked as might be the case when a multi-session configuration is mapped to a single session client or a null session once it has terminated. Session policies 1130 comprise a variety of policies including auto-connect policy 1132, security policies 1134, administrative policies 1136 and protocol policies 1138. In an embodiment, auto-connect policy 1132 specifies login credentials that facilitate automatic connection to a particular host. In another embodiment, auto-connect policy 1132 defines an abstracted connection path that enables a configuration with multiple sessions to be mapped to a client that only supports a single session. In such an embodiment, the policy identifies a host intermediary (e.g. a VM) enabled to provide both client agent and remote computing agent services.

The host intermediary terminates the multiple sessions to hosted applications and simultaneously proxies as an application host that presents a single session connection to the current endpoint. Security policies 1134 may be used to set encryption criteria or access policies that restrict the session by criteria such as client identity, location information, session-in-session limitations and the like. Security policies 1134 may define constraints on how data is shared with other sessions. One such "cut and paste" policy defines whether data may be "cut" or "copied" from the present session (including for example a whitelist of authorized recipient sessions or a blacklist or unauthorized recipient sessions) or similarly rules for "pasting" such data in from another session.

Administrative policies 1136 may include 'time-of-day' based access regulations, parental controls such as session duration limitations and other administrative policies such as constraints on the available topology resources. Another administrative policy controls visibility of specific configurations 620 and/or sessions 730 in accordance with the active security policy. Protocol policies 1138 may be used to store attributes and restrictions for the protocols associated with the session 730 and rules for managing endpoint disparity or client setup when connected to a host with limited capabilities. Such attributes include image and audio bandwidth, frame rate, image quality, authorized peripherals and so on. An exemplary rule for managing endpoint disparity manages the difference between video resources (e.g. Video RAM) available to the computing application and display attributes (e.g. number and resolution of displays) of the client topology.

If a hosted desktop has a limited size video memory for only one display as an example, but the client topology comprises 2 or 4 displays configured as a multi-monitor resource, a rule is used to limit the session to only one display in accordance with the hosted desktop capability. The rule might further dictate selection of a specific default display for the best user experience. Other such rules for dealing with host limitations might suitably be addressed via administrative policies since an administrator typically determines the capabilities of a host associated with a hosted desktop or application. In some embodiments, protocol policies 1138 prescribe CPU, memory or network constraints on the available client resources which enables managed sharing of such client resources amongst competing sessions.

Operating system configuration 1140 includes display settings 1142 which stores display scaling information, desktop settings 1144 store icon positions, wallpaper preferences, aero glass preferences and other settings such as audio volume, default language, keyboard layout, HID settings such as touch sensitivity and so on. Disconnect rules 1146 provide session termination instructions which specify whether a hosted desktop is disconnected (with applications active), logged off (applications terminated), shut down or restarted. Each session 730 generally comprises at least one window 1150 (shown as a window 1150-1 and a window 1150-2) utilized to store window attributes described further below. Session characteristics 1160 provide information useful for endpoint configuration manager in selecting or advertising appropriate configurations and dependent sessions for a specified client. Such characteristics include performance analytics (delivered frame rate, latency, packet loss, image quality etc. and associated timestamps) useful in determining an optimum host location in relation to the client location, or usage patterns for the same session and concurrent sessions useful in advertising new configurations.

Figure 12:
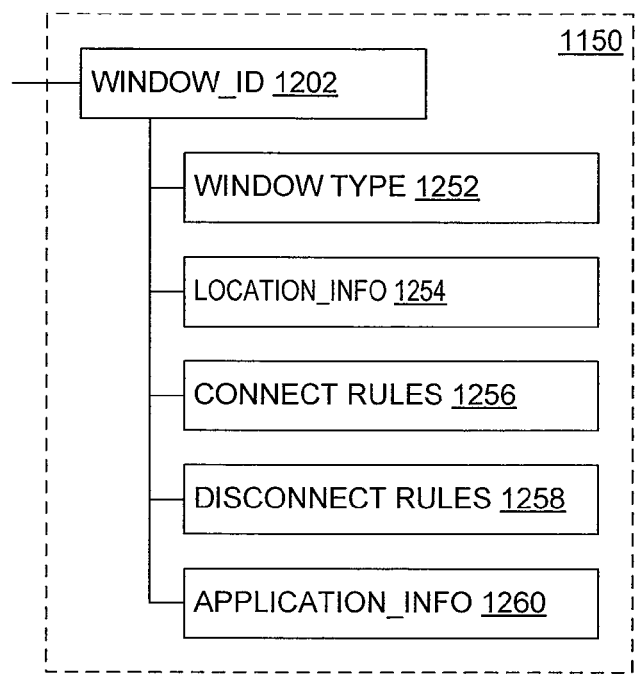
FIG. 12 illustrates a logical hierarchy for attributes of a window.

FIG. 12 depicts a logical hierarchy for attributes of a window 1150, identified by WINDOW_ID 1202. Window Type 1252 specifies if a window is an entire remote desktop (generally without further visibility into applications associated with the remote desktop) or an application window associated with a remote desktop or hosted application or a session-in-session window which enables either a session 730 or an entire 'child configuration' 620 associated with a different identified client to be defined within a window 1150. Window location information 1254, including window coordinates and Z-ordering information, define the window position which may be used by R.C. agent 112 to reduce communication bandwidth by observing cropping boundaries that identify visually hidden parts of a window. Connection rules 1256 are used to configure a desktop during session establishment by launching specified applications.

Conversely disconnect rules 1258 specify actions to be taken upon disconnection such as application termination. In some embodiments, window 1150 comprises application information 1260 which serves as a data store for the application associated with the window. As one example, a client (e.g. client 140) comprises a software browser with browser storage facilities redirected to configuration store 122. Such an approach enables, for example, separation of cookies from the browser itself. This eliminates any possibility of residual user-related information being stored on the client once disconnected from network 130 which enhances the security of the client. However, the user continues to benefit from the convenience of cookies as they are retrieved from application information 1260 when the user launches the browser from the same client at a later time or a compatible browser from a different client.

Figure 13:
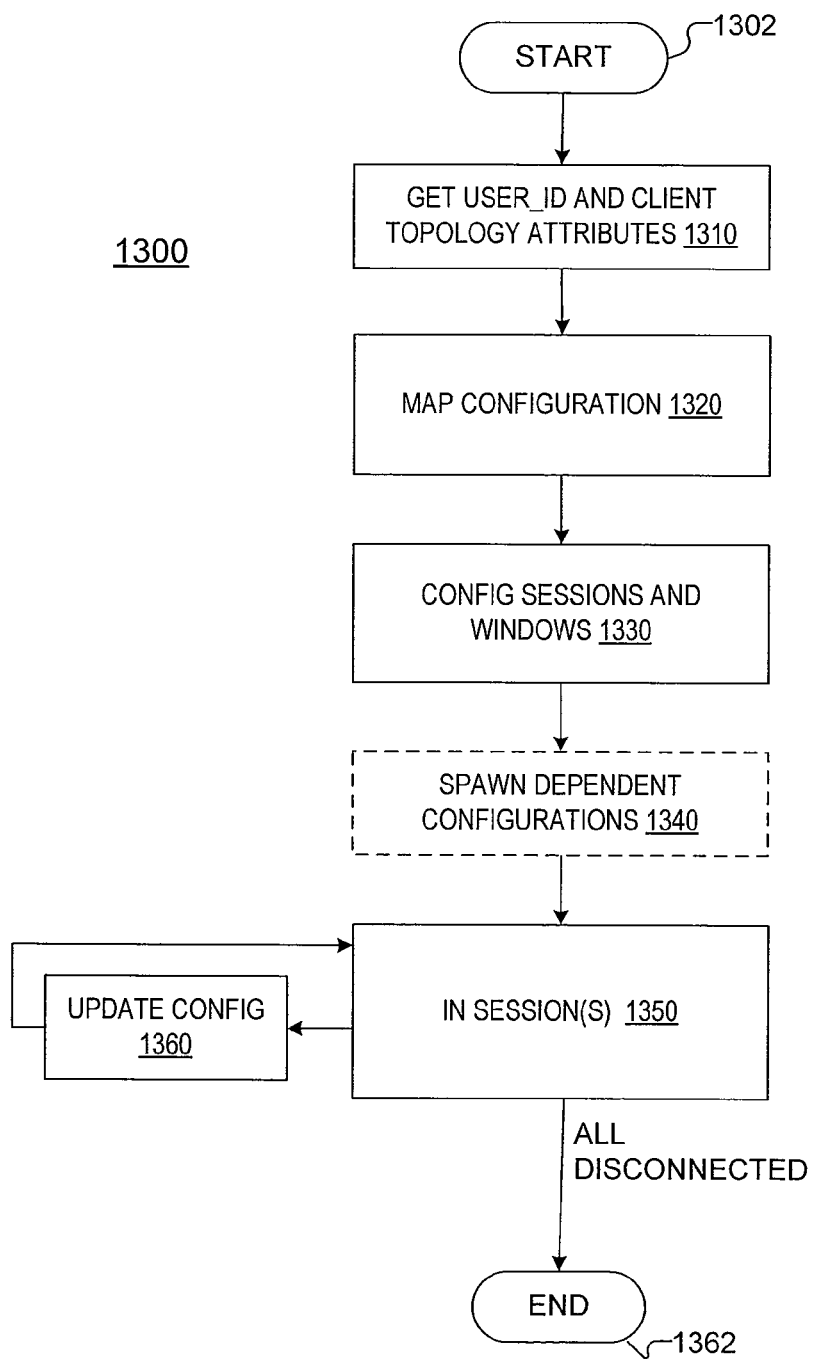
FIG. 13 illustrates a flow diagram of a method for managing the mapping of a configuration to a client.

FIG. 13 illustrates a flow diagram of embodiment of a method 1300 for managing the mapping of a configuration to a client. Process 1300 starts ("Start" 1302) and proceeds to step 1310 ("Get User ID and Client Topology Attributes"). According to various embodiments, step 1310 comprises presenting a user at a client with a login menu, acquiring user credentials and acquiring topology attributes 630 from the client.

Process 1300 proceeds to step 1320 ("Map Configuration") in which a suitable configuration 620 is selected for the client based on user ID 610 and mapping criteria. An embodiment of step 1320 is described by process 1400 in FIG. 14.

Process 1300 proceeds to step 1330 ("Configure Sessions and Windows") in which topology preferences 710 and network preferences 720 are applied to the client, the various sessions 730 and related windows 1150 associated with the configuration 620 are parsed and the usage characteristics 740 for the configuration are updated. Session parsing typically comprises establishing a session defined by type 1110 according to session policies 1130. In some embodiments, the remote operating system or application is configured according to parameters associated with OS CONFIG 1140 and application windows launched and configured according to window parameters 1150. In some embodiments, a window may be associated with a child session in which case a "session-in-session" is launched. In other embodiments, so-enabled sessions are redirected to a host intermediary which proxies as a multi-session client.

In an embodiment in which a client supports multiple sessions, each session may be granted a "virtual portion" of the client topology. On initialization, each session is assigned a default window layout and the corresponding hosted desktop or application is provided scaling information, window cropping criteria, device assignment, USB port assignment and the like. In some embodiments, USB ports are pooled such that devices may be utilized across sessions. Desktop scaling and cropping parameters for each session are exchanged within a session (i.e. directly between host and client) or facilitated by endpoint configuration manager 126 in different embodiments; window layout updates are provided to endpoint configuration manager 126 at intervals and/or at disconnect for storage as window information 1150 and utilization in conjunction with subsequent sessions. Given the hosted desktop is operating with "virtual topology" information, layout information referenced in absolute co-ordinates is generally provided by the client.

In some embodiments in which a session comprises a child configuration or a session-in-session, process 1300 proceeds to step 1340 ("spawn child configuration") otherwise process 1300 proceeds to step 1350. At step 1340, a child configuration (comprising a full or partial set of session window and topology parameters as described for configuration 620) associated with a second identified client (for example, as identified by window type information 1252) is used to establish one or more dependent sessions terminated at the second client. Endpoint configuration manager 126 may be required to initialize and authenticate the second client before establishing sessions or opening application windows. The connection status of child sessions are monitored so that sessions can be re-established in event of connection failures or interruptions and parent sessions can be terminated if a user initiates disconnection of the child session at step 1350.

Process 1300 proceeds to step 1350 in which one or more local or remote computing and/or application sessions are active. In event a change in configuration is detected (i.e. a change in physical topology or topology preferences, mobile location change or change in window or session state including addition or termination of sessions), the configuration is updated at step 1360 and process 1300 returns to step 1350. In some embodiments in which a configuration is assigned to a role 612, other configurations associated with the role are updated to reflect the change in topology or preferences. At step 1350, a new configuration may be defined or the existing configuration updated, for example as specified by a configuration update preference. Session characteristics 1160 are updated to reflect changes in performance, usage patterns and so on for use in assisting the determination of new configurations. If windows are closed or sessions terminated, disconnect rules (1146 and 1258) are followed. After all sessions are terminated, process 1300 ends at step 1362. The user may be prompted to i) save the last used role or configuration (i.e. final window placement etc.) as the starting point for next use or ii) ignore configuration changes during step 1350 and revert to the initial configuration (i.e. pre step 1330) at the subsequent log on.

Figure 14:
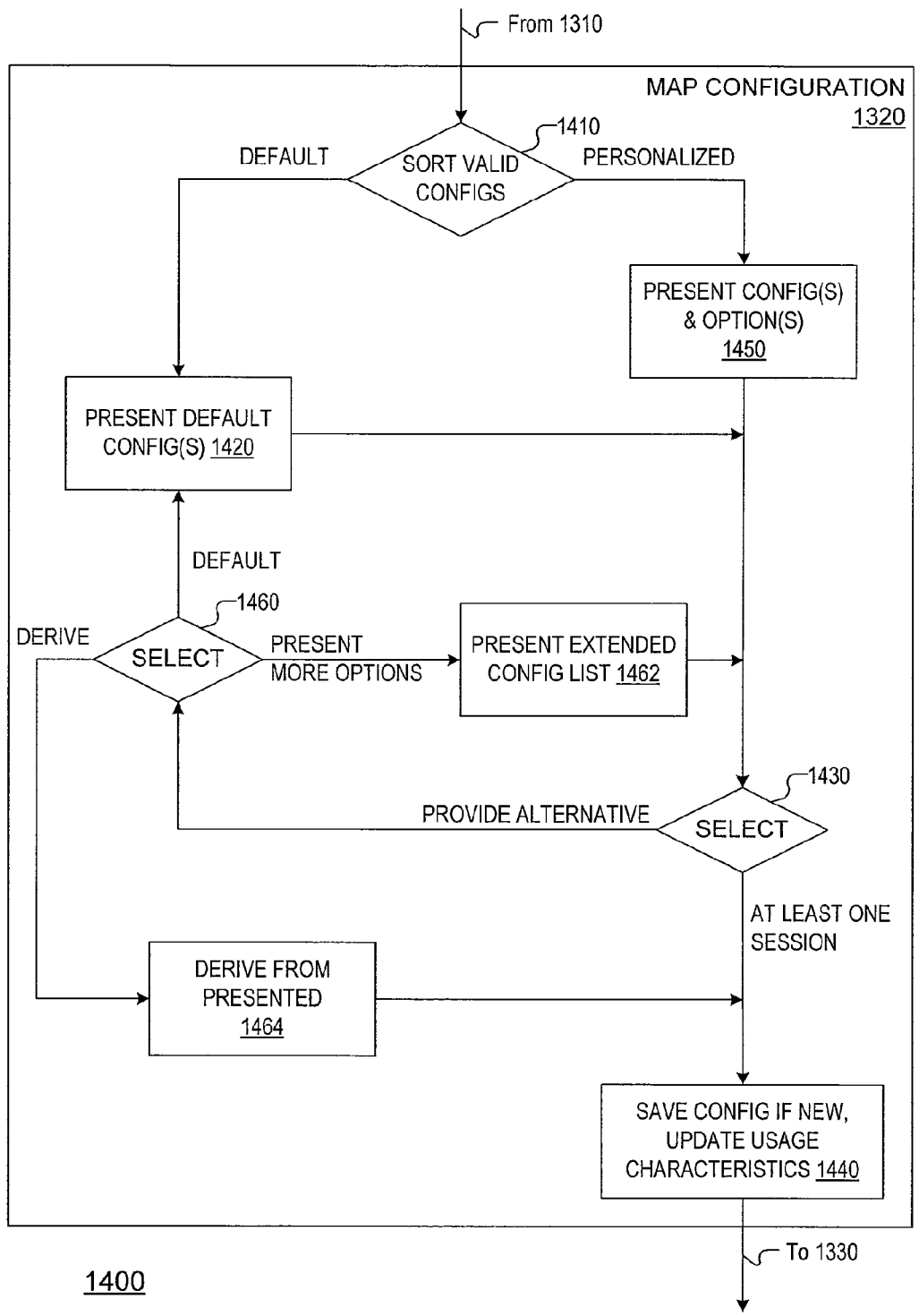
FIG. 14 illustrates a flow diagram of a method for mapping a configuration to a client.

FIG. 14 illustrates a flow diagram for a method 1400, an embodiment of a step 1320 in method 1300 for mapping a configuration to a client. At step 1410, valid configurations are sorted to determine if one or more configurations are prescribed for automatic selection ('auto-select') or one or more alternative configurations should be presented to a user for selection. Typical sorting criteria include 'last used', 'last used on same client', 'location' based, 'alphabetical' by configuration name, 'role' based, 'time of day' based, derived according to best-fit criteria, available applications, security considerations, performance-based or alternatively one or more 'default' configurations selected. In an embodiment, a particular configuration or session is excluded from selection in step 1320 unless requirements of security policy 1134 are met.

When such configurations or portions of configurations are culled and not presented in the same ordering as stored in the configuration store 122 based on security policy, endpoint configuration manager 126 is engaged to manipulate and parse available configurations before being presented at the client via the client configuration services 510. In some embodiments, a new role template comprising a pick list of available remote desktops and/or remote applications and/or local applications compatible with the physical client topology is generated for presentation and a configuration only saved once a user has selected one or more resources from the new role template. Configuration manager 126 may provide a secondary menu in which such best fit and sorting criteria are prioritized, 'auto-select' configurations are specified, the number of presented configurations regulated and so on. Map 1600 below depicts ways in which a new configuration may be derived based on the user's role and/or location (i.e. client identity).

In event no personalized configuration can be determined (for example in the case of a new user), method 1400 proceeds to step 1420 in which one or more default roles and associated configurations (as might be prescribed by a system administrator) are presented to the user. At step 1430, the user selects one of the presented configurations and method 1400 proceeds to step 1440 in which the configuration is saved (in the event it is a newly determined configuration) and usage characteristics updated. In event a default role and configuration has been selected at step 1430, the user may be prompted to give the role a personalized name for future access.

If, at step 1410, one or more personalized configurations are determined, these are presented at step 1450, following which one is selected at step 1430. If, at step 1430, the user seeks an alternative role or configuration (i.e. not currently presented), method 1400 proceeds to selection step 1460 in which either the user is presented with additional configuration options in an extended (or alternative) configuration list at step 1462 or a new configuration is derived from a presented configuration at step 1464. In an embodiment, step 1462 comprises adding one or more computing resources and/or deleting one or more other computing resources from one of the configurations presented at step 1450 or 1462 based on best fit or user-specified search criteria.

Figure 15:
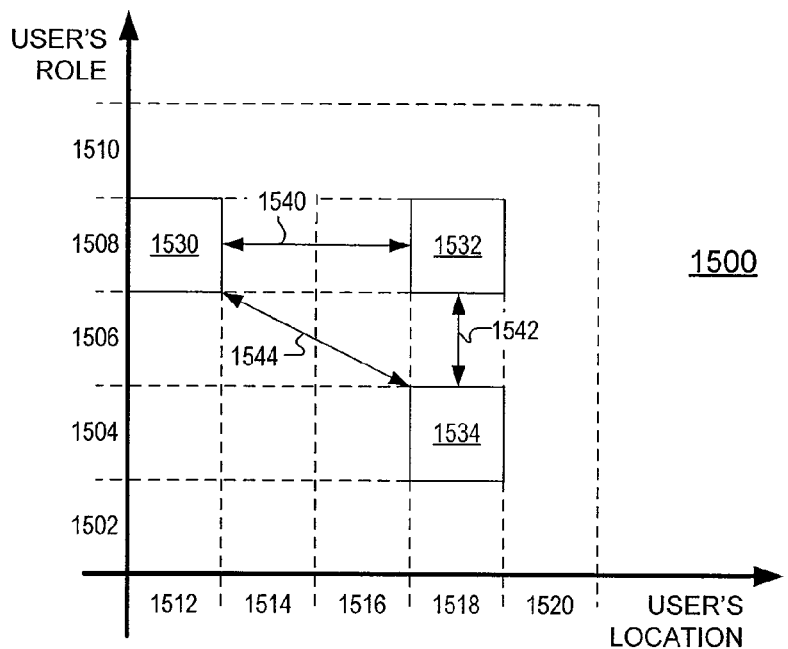
FIG. 15 depicts a map used by an endpoint configuration manager to manage transformations between existing configurations.

FIG. 15 depicts a map 1500 used by endpoint configuration manager 126 to manage transformations between existing configurations thereby enabling a user to access computing resources based on a combination of a user's role and location. Map 1500 is associated with an identified user 602 and comprises configurations organized according to various historic and/or pre-defined roles (ref roles 1502, 1504, 1506 and 1508) and various previously identified clients (or 'locations') utilized in such roles (ref. locations 1512, 1514 1516 and 1518) in addition to templates for future configurations. A user's role is characterized by topology preferences, network preferences and session attributes related by a common task in which the user is engaged. Role 1510 and location 1520 are reserved for future identified configurations.

Configuration 1530 defines a user 602 (e.g. a laboratory technician) in his or her role 1508 (e.g. conducting a scientific experiment A) using client 1512 (e.g. a client in the laboratory with dual monitors) and a computing session defined by parameters 730 which might for example comprise a hosted desktop with several concurrent active application windows. Configuration 1532 defines the user 602 in the same role 1508 using client 1518, for example a smartphone, to access the hosted desktop. However, configuration 1532 may comprise different session attributes better matched to the capabilities of the smartphone. As an example, role 1508 may be characterized by a single maximized application window that enables user 602 to monitor progress of Experiment A outside the laboratory. Configuration 1534 defines user 602 in a different role 1534 (e.g. conducting an experiment B) accessing computing resources from client 1518. For example, configuration 1534 may be characterized by display of a different maximized application window associated with the same hosted desktop, a different hosted desktop or a hosted application from an unrelated server.

Transformation 1540 represents the mapping of configuration attributes between configurations 1530 and 1532 associated with role 1508, transformation 1542 represents the mapping of configuration attributes between configurations 1532 and 1534 associated with device 1518 and transformation 1542 represents the mapping of configuration attributes between configurations 1530 and 1534 associated with changes in both role and device. Each transformation observes transformation rules determined by white- and/or blacklist administrative policies, user defined preferences and optionally best fit criteria based on usage characteristics 740 and session characteristics 1160, enabling selective topology, network and session preferences to be maintained or mapped using best fit methods across a specified range of clients within a defined role or similarly across a specified range of roles for a determined client. As examples, language, printing or audio preferences, window positions, image quality, network bandwidth consumption, connection policies and routing preferences may all be managed across any selection of user roles and devices.

Figure 16:
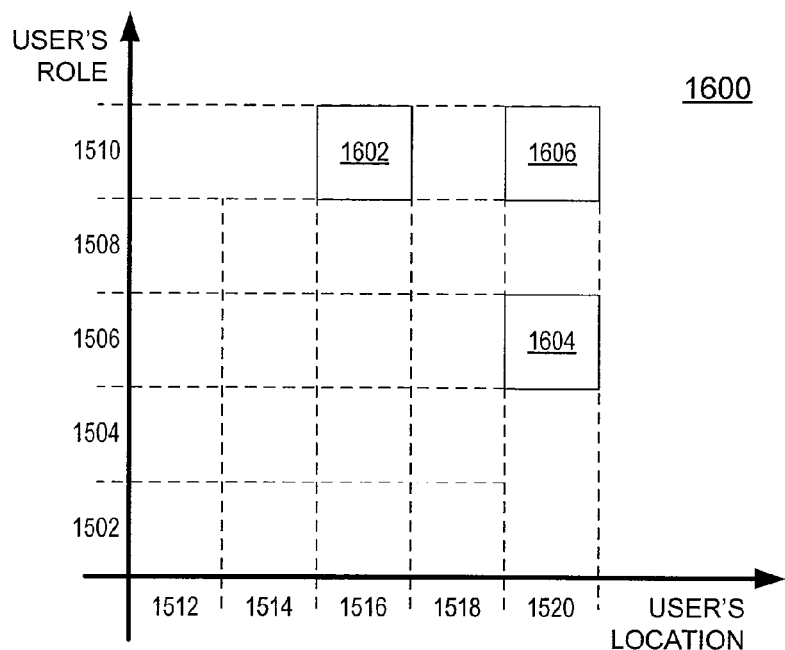
FIG. 16 depicts a map used by an endpoint configuration manager to present new, sorted or derived configurations for a user to access computing resources.

FIG. 16 depicts a map 1600 used by endpoint configuration manager 126 to present new, sorted or derived configurations for a user to access computing resources based on previously utilized roles and/or locations. New configuration 1602 is defined for a new role 1510 and previously identified client 1516. In an embodiment, a new role and related configuration 1602 is specified by the user based on a change in session or application window mix. In another embodiment, endpoint configuration manager 126 automatically defines the new role 1510 and related new configuration based on repeated usage patterns such as a particular mix of application windows or particular mix of network or device preferences detected as repeatedly selected at a particular time or day. In another embodiment, a new configuration 1602 is derived in part from preferences associated with previous roles using the same client 1516. The new configuration 1602 may be presented (ref. steps 1450 and 1462) based on last used configuration at the same client (i.e. a different role), most actively used previous configuration at the same client, time of day access criteria and so on. In another embodiment, a new configuration 1602 is derived in part from quality of experience derived from statistics such as delivered frame rate, packet loss, latency or image quality stored in association with previous roles using the same client 1516.

New configuration 1604 is defined for a previously role 1506 and a newly-identified client 1520. In an embodiment, configuration 1606 presents a best-fit transformation of preferences associated with previously defined devices for same role. Usage characteristics and preferences (i.e. topology, network and session preferences) for all configurations in role 1506 are compared in view of administrative policies and a set of preferences is selected and/or derived based on best fit rules. In a select embodiment, a new configuration selects alternative computing resources (e.g. a preferred hosted desktop or preferred hosted application location) based in part on the location of the newly-identified client in relation to computing resources in order to optimize quality of experience or use a preferred network path. In one such embodiment, the new configuration specifies a session with direct access to local applications (for example as advertised by physical topology attributes of a laptop client comprising a suite of office applications) as a substitute for a remote computing session in order to maximize user experience and limit bandwidth demands on the network.

New configuration 1606 is defined for a newly-defined role 1506 and a newly-identified client 1520. One sorting strategy for presenting a new configuration 1606 involves first determining which client device in map 1600 has best matching physical topology attributes and deriving the new configuration from the most recently- or actively-used role associated with the best matching client.

Figure 17:
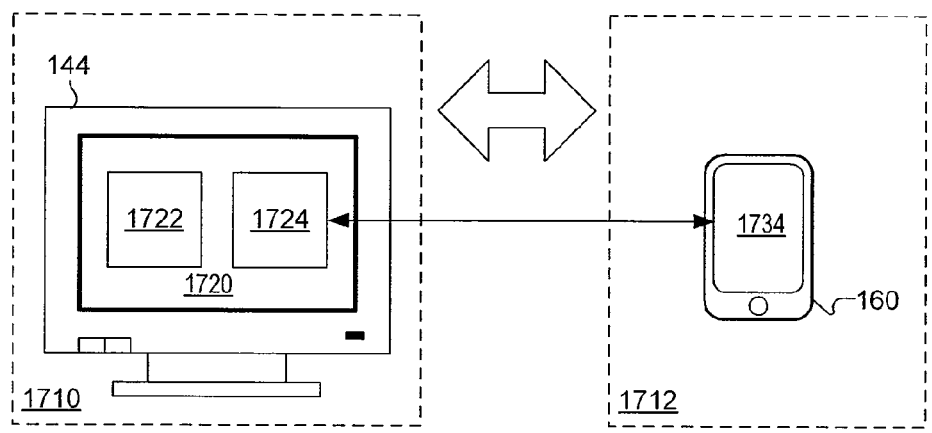
FIG. 17 illustrates a user switching between two devices and configurations within a single role in which sessions are automatically managed according to device identity.

FIG. 17 illustrates an example of a user switching between two client devices and configurations within a single role in which sessions are automatically managed according to client device identity. Configuration 1710 comprises a single session defined by a collection of windows including window 1720 associated with a hosted desktop such as hosted desktop 110, an application window 1722 directly associated with the hosted desktop (i.e. an application executed by the hosted desktop) and a remote application window 1724 associated with a remote application session between a hosted application and the hosted desktop (i.e. the hosted desktop serves as a client for a hosted application typically executed by a separate server). When the user connects from mobile client 160 using configuration 1712, mobile client 160 connects directly to the application server previously associated with remote application window 1724 and establishes a session with window 1734 as specified by window type parameters (ref. windows type 1252). Such an embodiment supports universal, multi-modal and automated access to server-based applications by enabling native access from both mobile device applications (typically tailored for touch-based interaction via a limited display using constrained bandwidth) and full featured clients with for example, unlimited access bandwidth.

Figure 18:
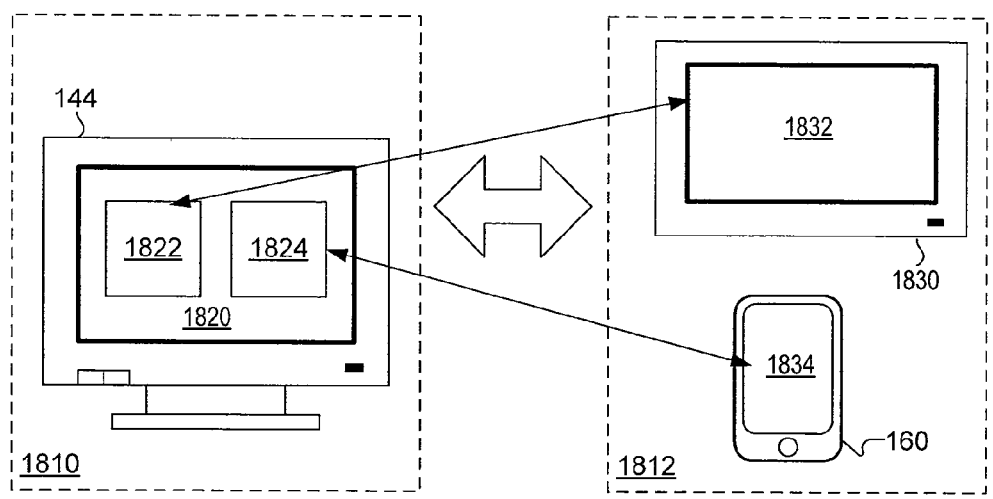
FIG. 18 illustrates a user switching between two configurations in which one of the configurations comprises a dependent configuration associated with a different client.

FIG. 18 illustrates an example of a user switching between two configurations in which one of the configurations comprises a dependent configuration associated with a different client, for example a large display client 1830. Configuration 1810 comprises a single session defined by a collection of windows including window 1820 associated with a hosted desktop such as hosted desktop 110, an application window 1822 directly associated with the hosted desktop (i.e. an application executed by the hosted desktop) and a remote application window 1824 associated with a remote application session between a hosted application and the hosted desktop (i.e. the hosted desktop serves as a client for a hosted application typically executed by a separate server). When the user connects from mobile client 160 using configuration 1812, mobile client 160 connects directly to the application server previously associated with remote application window 1824 and establishes a session with window 1834 as specified by window type parameters (ref. windows type 1252). Additionally, configuration 1612 comprises configuration parameters for a 'child session' used by endpoint configuration manager 126 to spawn a second session in which the hosted desktop previously associated with window 1820 is connected to client 1830 and further in which window 1822 of session 1810 is configured for 'maximized' (i.e. full screen mode) in configuration 1812. Such an embodiment enables a user to freely move between a private computing environment such as an office or cubicle and a public environment such as a meeting facility, lecture room, doctor's consultation office or surgery theatre in which select windows require public visibility and visibility of other select windows remains restricted.

Figure 19:
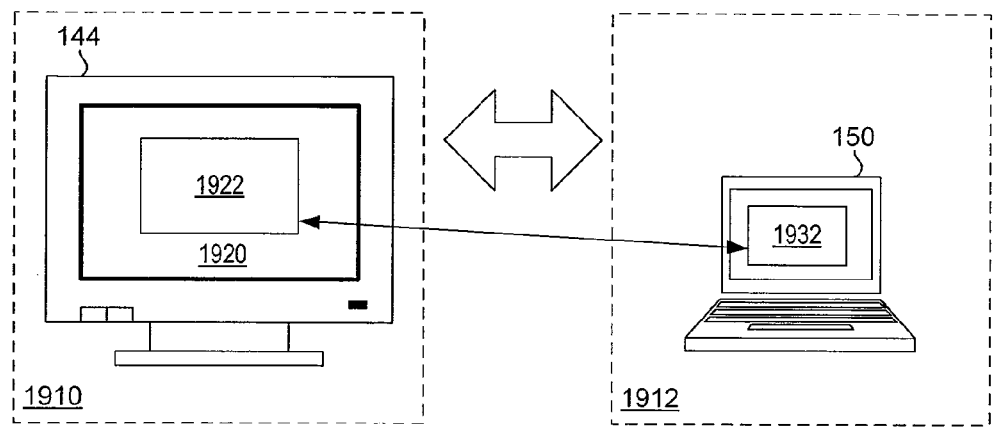
FIG. 19 illustrates a user switching between two configurations in which one of the configurations accesses local computing resources.

FIG. 19 illustrates an example of a user switching between two configurations in which one of the configurations accesses local computing resources, such as a laptop client 150 configured with local operating system and a suite of office applications. Configuration 1910 comprises a single session defined by a collection of windows including window 1920 associated with a hosted desktop such as hosted desktop 110, and an office application window 1922 (e.g. Microsoft EXCEL spreadsheet program) executed by the hosted desktop. When the user connects from client 150 using configuration 1912, client 150 connects directly to a locally available application equivalent to that provided by configuration 1910 (i.e. a local copy of Microsoft EXCEL spreadsheet program executed by the processor and operating system of client 150) which is presented in window 1932. In some embodiments, configuration 1910 comprises multiple sessions, at least one of which connects to the hosted desktop for select remote application services and another of which connects to the local operating system to provide select local application services. In some such embodiments, the application control menu for the hosted desktop redirects select commands presented by the hosted desktop (such as application launch commands) back to local applications to provide the user with a seamless experience.

Figure 20:
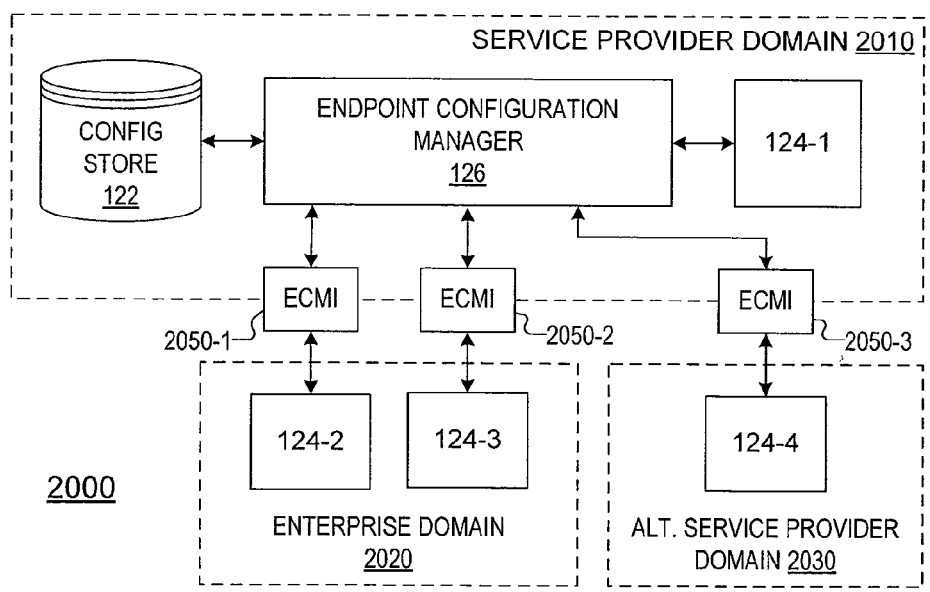
FIG. 20 illustrates a configuration management hierarchy in which connection managers in an enterprise domain interact with endpoint configuration services in a service provider domain.

FIG. 20 illustrates a configuration management hierarchy 2000 in which connection managers located in an enterprise domain interact with endpoint configuration services in a service provider domain to provide continuous endpoint configuration management for users extended to their professional and personal capacities (i.e. across a broad spectrum of user roles). Specifically a service provider domain 2010 such as an Internet service provider, Desktop-as-a-Service (DaaS) provider, cloud service provider (e.g. Google or Amazon) comprises configuration store 122 coupled to endpoint configuration manager 126. The service provider generally has its own connection management infrastructure (shown as a connection manager 124-1) providing connection management policies for client devices or users under subscription. Enterprise domain 2020 comprises multiple remote computing protocols, each typically facilitated by a native connection manager (shown as connection managers 124-2 and 124-3). For example, an enterprise may provide both RDSH and VMware View connection management services. The service provider provides an Endpoint Configuration Management Interface (ECMI), shown as EMCI 2050-1 and EMCI 250-2 to the enterprise to unify management of configurations across the domains. In some embodiments, the service provider facilitates further unity by providing additional EMCI points that enable additional connection managers such EMCI 2050-3 to connection manager 124-4 of service provider domain 2030.

Figure 21:
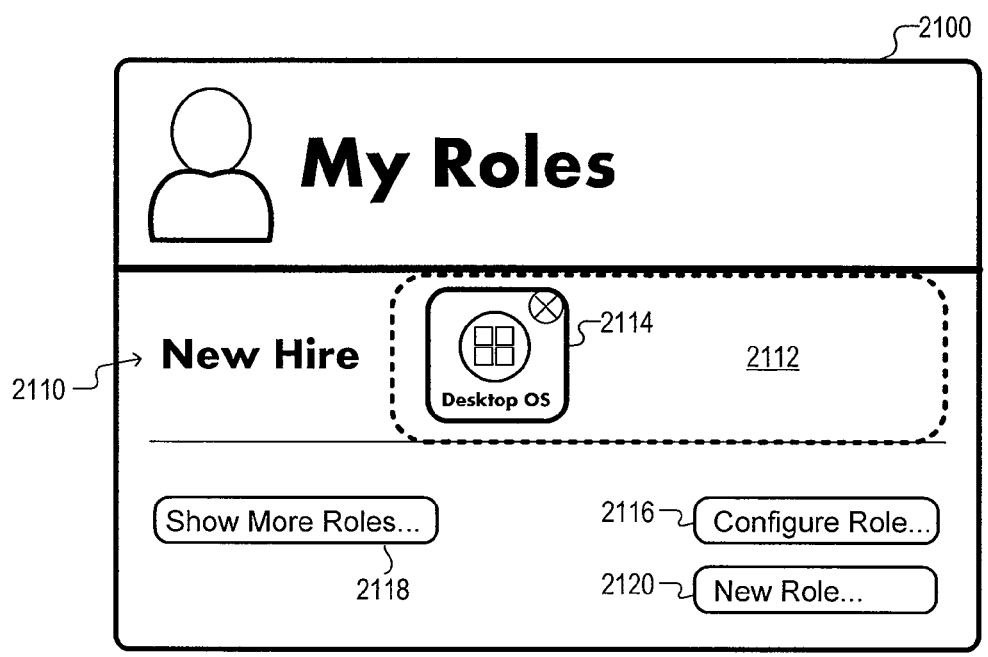
FIG. 21 illustrates an exemplary configuration menu as might be presented to a new user at a client as part of a login sequence.

FIG. 21 illustrates an exemplary configuration menu 2100 as might be presented to a new user (e.g. a new employee) at a client as part of a login sequence. The new user is provided a single default "New Hire" role 2110, comprising a configuration 2112 having a single available "desktop OS" session 2114. Clicking a pointer on the demarcated area associated with the configuration 2112 initiates a connection between the client and the hosted desktop associated with session 2114. By launching a "Configure Role" sub-menu 2116, the user is enabled to tailor menu 2100, for example by renaming role 2110, renaming session 2114, editing topology preferences 710 or network preferences 720 associated with role 2110, add or remove sessions from configuration 2112 and so on. By launching "Show More Roles" sub-menu 2118, the user might be presented with additional pre-configured roles as might be provided by an administrator. By launching a "New Role" sub-menu 2120, the user is enabled to design a new role comprising a configuration of one or more sessions.

Figure 22:
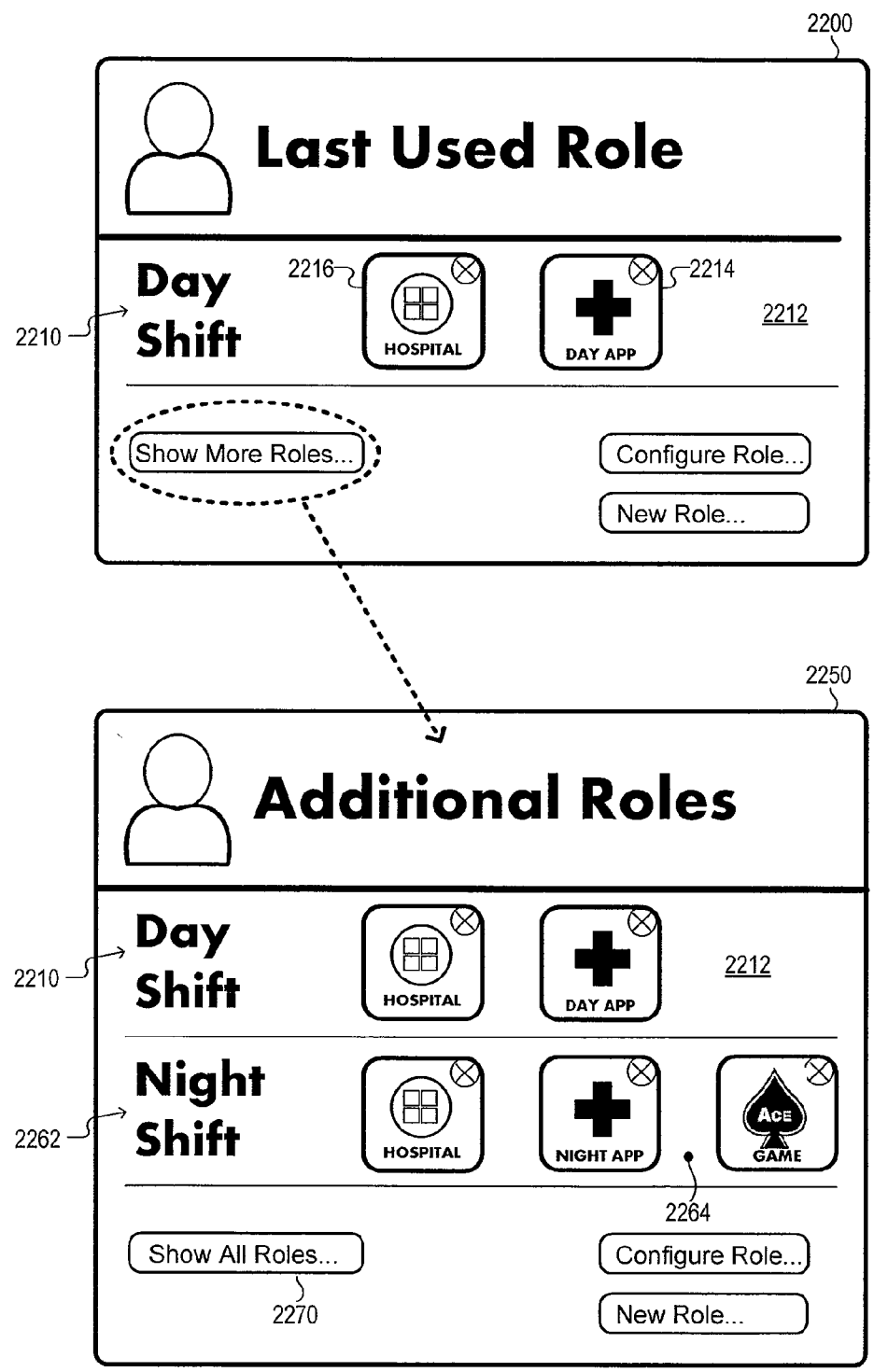
FIG. 22 illustrates an exemplary configuration menu as might be presented to a known user with a pre-existing set of roles and configurations.

FIG. 22 illustrates an exemplary configuration menu 2200 as might be presented to a known user with a pre-existing set of roles and configurations. The user is presented with a last used "Day Shift" role 2210, comprising configuration 2212 with "Hospital" session 2016 (e.g. a hosted desktop) and "Day App" session 2012 (e.g. a hosted application). The user might be enabled to launch sessions 2114 and 2116 by clicking on the configuration area 2212 or to seek an alternative configuration by clicking on the "Show More Roles" button, following which an "Additional Roles" sub-menu 2250 is launched. Sub-menu 2250 presents an additional "Night Shift" role 2262 comprising corresponding configuration 2264 with a set of sessions. At this point, the user might launch either of the presented configurations, seek further additional roles, create a new role or further configure one of the presented roles 2210 or 2262.

Figure 23:
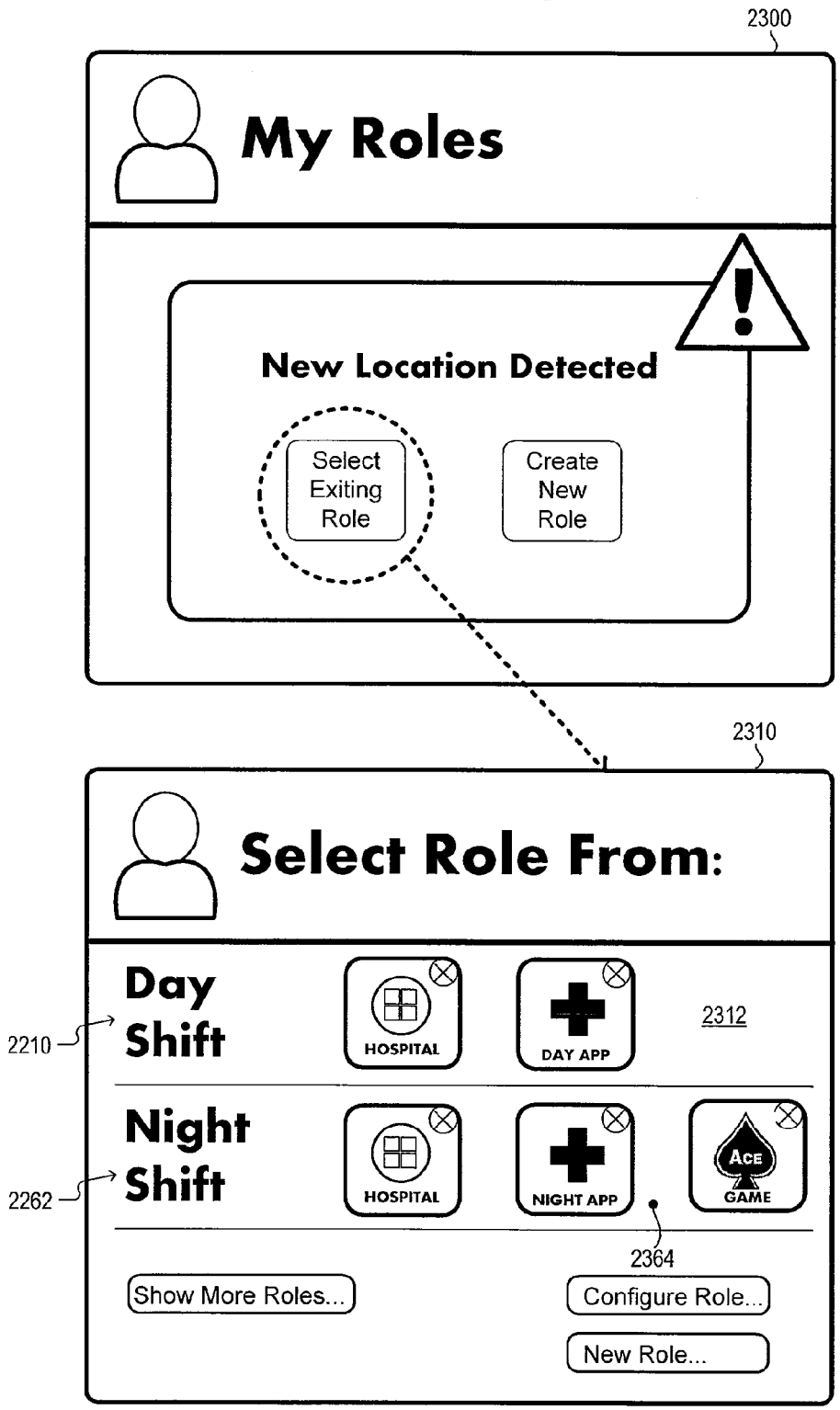
FIG. 23 illustrates an exemplary information dialog box as might be presented to a known user with a pre-existing set of roles and configurations seeking a configuration from a newly-identified client.

FIG. 23 illustrates an exemplary information dialog box 2300 as might be presented to a known user with a pre-existing set of roles and configurations seeking a configuration from a newly-identified client, for example as determined by endpoint configuration manager 126. By selecting an existing role, the user is presented with sub-menu 2310 comprising a set of roles 2210 and 2262 determined to be compatible with the newly-identified client. Note that configuration 2312 may comprise identical set of sessions to configuration 2112 but topology preferences and session attributes may be automatically adjusted by endpoint configuration manager 126 to support the physical topology attributes of the newly-identified client. For example, window sizes, positions or desktop icon placement might be adjusted to support changed display resolution or display profile attributes, peripheral device preferences re-mapped to the set of devices associated with the new client or a similar hosted application selected from a server at a better location in relation to the new client to meet performance objectives.

Figure 24:
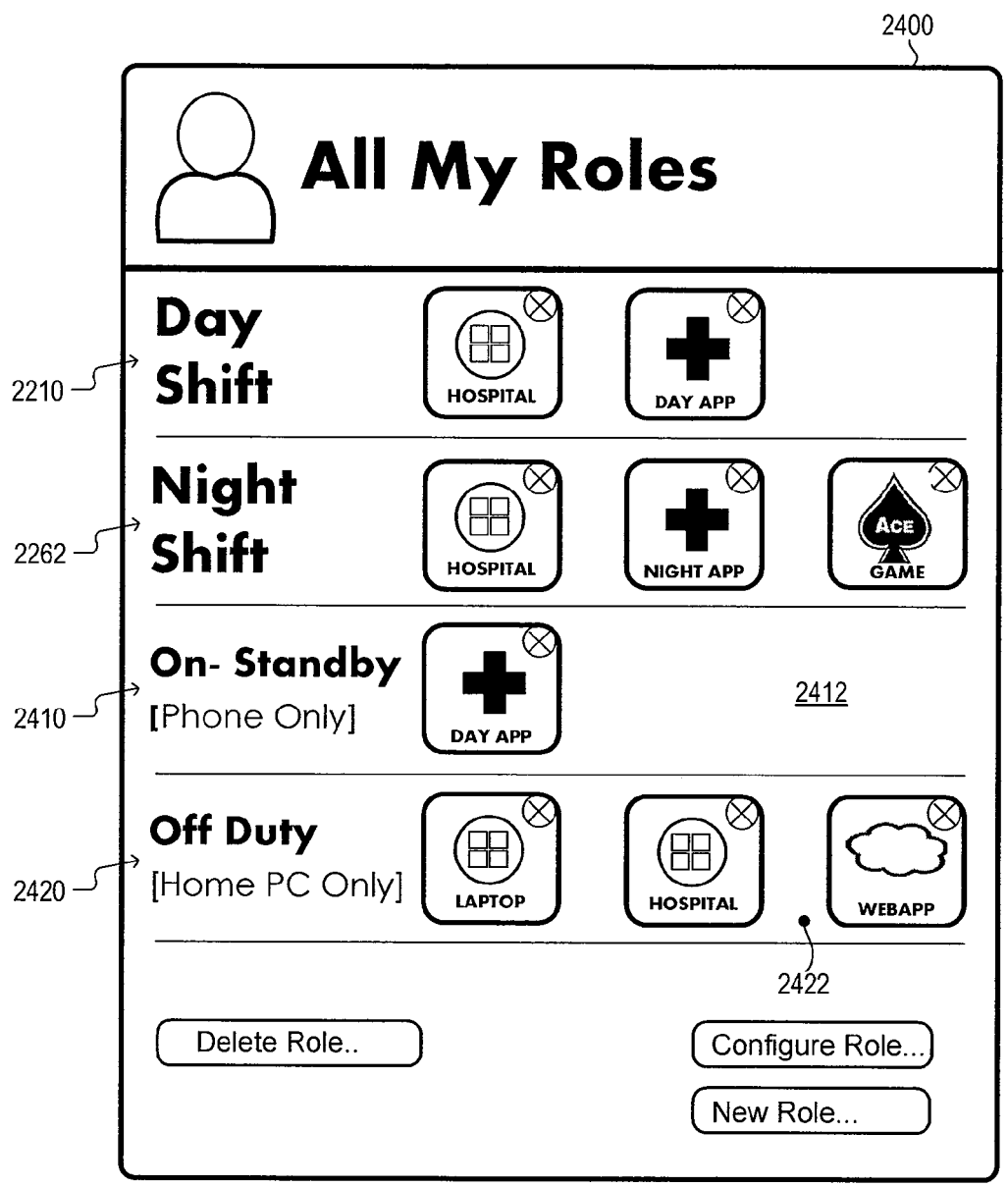
FIG. 24 illustrates an exemplary configuration menu as might be presented to a known user with a pre-existing set of roles and configurations seeking a comprehensive list of roles.

FIG. 24 illustrates an exemplary configuration menu 2400 as might be presented to a known user with a pre-existing set of roles and configurations seeking a comprehensive list of roles associated with the user, for example by navigating "Show All Roles" button 2270 on sub-menu 2250. Menu 2400 lists roles 2210 and 2262 previously described. Additional roles 2410 and 2420 are also presented but include a warning indication (e.g. warning icon, footnote or grey font) that configurations 2412 and 2422 are incompatible with the presently identified client, for example a UC configuration 2412 may be incompatible with a particular zero client physical topology, a multi-display CAD workstation configuration may be incompatible with a particular smart phone client, or a particular client may be blocked for security reasons. In some embodiments in which a configuration is defined in conjunction with a minimum acceptable user experience (as might be impacted by client and/or network capabilities), a user may be presented with an option for accepting a configuration or particular session that will operate below the minimum acceptable user experience. Some applications such as medical imaging applications might be accompanied by appropriate warnings before allowing such overrides. In some embodiments, a subset of sessions associated with a particular role may be unavailable based on security criteria or other incompatibilities and therefore 'greyed out' or not shown but available sessions are presented as normal.

Figure 25:
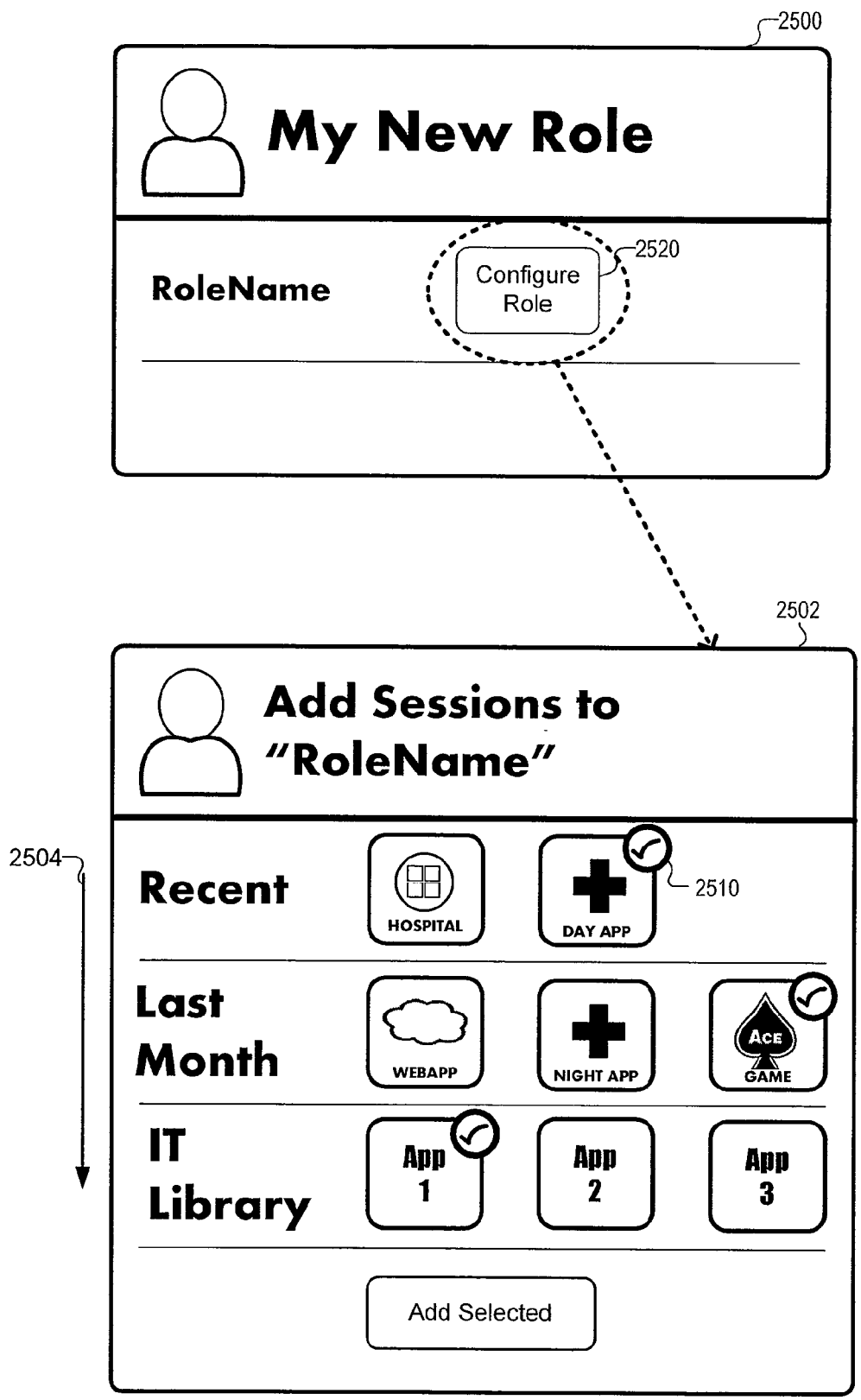
FIG. 25 illustrates exemplary configuration menus as might be presented to a user seeking to define a new role or update an existing role.

FIG. 25 illustrates exemplary configuration menus 2500 and 2502 as might be presented to a user seeking to define a new role (e.g. using button 2120). The user is presented with a landing window 2100 in which the role can be named and a "configure role" button 2520 which navigates to window 2502. Note that a variation on window 2502 may also be reached via configure role button 2116. Window 2502 presents a list of available sessions in an order 2504 which might be chronological, alphabetical, most used or based on relevance to the user, for example as determined by configuration usage characteristics 740 or session characteristics 1160. Checkbox 2510 is used to add sessions to a role, similarly sessions might be removed from a role using a similar mechanism.

While the foregoing is directed to embodiments of the present invention, other and further embodiments of the invention may be devised without departing from the basic scope thereof, and the scope thereof is determined by the claims that follow.

The invention claimed is:

1. A computer-implemented method for endpoint configuration management comprising:
   identifying, by an endpoint configuration manager, a new role associated with a presented client, the presented client seeking to establish a remote computing session with a host, wherein the new role is based on topology attributes of the presented client;
   deriving, from a set of stored endpoint configurations located in a configuration store, a new endpoint configuration supporting the new role, wherein the new endpoint configuration comprises topology preferences matching stored endpoint configurations used for a previous role, wherein matching is partly determined from a matched time of day;
   presenting to the presented client, the new endpoint configuration for selection; and
   establishing a first remote session utilizing the topology preferences defined by the new endpoint configuration.

2. The method of claim 1 wherein the topology preferences comprise window parameters, wherein the set of stored endpoint configurations are associated with at least one of a previously presented client topology or a previously saved endpoint configuration for the presented client.

3. The method of claim 2 wherein the window parameters comprise information for identifying screen position, window state and z-order of application windows.

4. The method of claim 1 wherein the new endpoint configuration comprises session parameters determined from usage characteristics associated with the set of stored endpoint configurations.

5. The method of claim 4 wherein the usage characteristics also identify the topology preferences for a set of applications.

6. The method of claim 1 wherein the new endpoint configuration further comprises session parameters determined from a geographic location of the presented client, and the session parameters specify a particular session host for the first remote session based on the geographic location of the presented client.

7. The method of claim 6 further comprising:
   automatically establishing the first remote session responsive to an auto-connection parameter in the new endpoint configuration.

8. The method of claim 1 further comprising:
   specifying computing resources of the presented client in the new endpoint configuration for the first remote session based on availability of an application local to the presented client, the application providing functionality equivalent to a remote application specified by one of the set of stored endpoint configurations.

9. The method of claim 1 further comprising:
   establishing a second local session between a user interface of the presented client and computing resources of the presented client, wherein a second endpoint configuration defines allocation of the computing resources for the second local session.

10. The method of claim 9, further comprising:
    establishing the second local session concurrently with the first remote session.

11. The method of claim 1 wherein the new endpoint configuration comprises:
    state information associated with one or more executing remote or local applications; and
    processor priority information associated with at least one of the presented client or a host computer specified by the new endpoint configuration.

12. The method of claim 1 wherein deriving the new endpoint configuration comprises:
    associating the new endpoint configuration with one or more rules for session behavior.

13. The method of claim 12 wherein the one or more rules comprise one or more of: limiting a number of displays used by the presented client, assigning a default display for the presented client, application display scaling rules, and session termination rules.

14. The method of claim 1 wherein the new endpoint configuration further defines a child session associated with a second client and wherein establishing the first remote session further comprises initiating the child session.

15. The method of claim 1 further comprising:
    identifying a plurality of additional endpoint configurations;
    excluding at least one from the plurality of additional endpoint configurations based on at least one of a configuration policy, an administrative policy or the topology attributes; and
    presenting at least one non-excluded one from the plurality of additional endpoint configurations for selection.

16. The method of claim 1 wherein deriving the new endpoint configuration comprises:
    extracting usage statistics for the set of stored endpoint configurations;
    forecasting infrastructure utilization and application capabilities for the presented client based on the usage statistics; and
    configuring at least one of the topology preferences and network preferences for the new endpoint configuration in accordance with the forecast.

17. An apparatus for endpoint configuration management comprising:
    a configuration manager that receives topology attributes from a first client and identifies a new role associated with the first client, deriving, from a set of stored endpoint configurations located in a configuration store, a new endpoint configuration supporting the new role, wherein the new endpoint configuration comprises topology preferences matching stored endpoint configurations used for a previous role, wherein matching is partly determined from a matched time of day, and presenting, to a second client, the new endpoint configuration for selection; and
    a connection manager for establishing a remote session between the second client and a host, utilizing the topology preferences defined by the new endpoint configuration.

18. The apparatus of claim 17, wherein the configuration manager is further enabled to search the configuration store for a plurality of related endpoint configurations; and present one or more of the plurality of related endpoint configurations to the second client.

19. The apparatus of claim 17, wherein the configuration manager is enabled to present a modification of the new endpoint configuration to the second client for selection.

20. The apparatus of claim 19, wherein the modification specifies computing resources of the second client based on availability of an application local to the second client, the application providing functionality equivalent to a remote application specified by the new endpoint configuration.

* * * * *